United States Patent
Nagase et al.

(10) Patent No.: US 9,557,621 B2
(45) Date of Patent: Jan. 31, 2017

(54) LIQUID CRYSTAL DISPLAY DEVICE

(71) Applicant: MITSUBISHI ELECTRIC CORPORATION, Tokyo (JP)

(72) Inventors: Akihiro Nagase, Tokyo (JP); Yoshikazu Yaji, Tokyo (JP); Tomohiro Sasagawa, Tokyo (JP); Atsushi Michimori, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/646,802

(22) PCT Filed: Dec. 13, 2013

(86) PCT No.: PCT/JP2013/007339
§ 371 (c)(1),
(2) Date: May 22, 2015

(87) PCT Pub. No.: WO2014/097591
PCT Pub. Date: Jun. 26, 2014

(65) Prior Publication Data
US 2015/0277164 A1    Oct. 1, 2015

(30) Foreign Application Priority Data

Dec. 20, 2012  (JP) .................................. 2012-278408
Feb. 27, 2013  (JP) .................................. 2013-037537

(51) Int. Cl.
*G02F 1/133*    (2006.01)
*G02F 1/137*    (2006.01)
(Continued)

(52) U.S. Cl.
CPC ............. *G02F 1/137* (2013.01); *G02F 1/1334* (2013.01); *G02F 1/13439* (2013.01);
(Continued)

(58) Field of Classification Search
CPC ..... G02F 1/137; G02F 1/13439; G02F 1/1523
(Continued)

(56) References Cited

U.S. PATENT DOCUMENTS 5,680,233 A *  10/1997  Faris .................. G02B 27/0093
348/E13.004
2004/0100598 A1 *  5/2004  Adachi ............. G02F 1/133536
349/113

(Continued)

FOREIGN PATENT DOCUMENTS

JP    5-307164 A    11/1993
JP    2001-318374 A    11/2001

(Continued)

*Primary Examiner* — Lucy Chien
(74) *Attorney, Agent, or Firm* — Birch, Stewart, Kolasch & Birch, LLP

(57) ABSTRACT

A liquid crystal display device is provided with a liquid crystal cell member, a light regulating member, a reflective polarizing member, and a control unit. The liquid crystal cell member has a first liquid crystal layer. An optical transmittance of the light regulating member changes with the application state of a second voltage. The reflective polarizing member transmits specific polarized light and reflects other polarized light. The polarization direction of light that is incident on the reflective polarizing member from the first liquid crystal layer is the same as the polarization direction of light transmitted by the reflective polarizing member. The control unit alters the application state of the second voltage in such a manner that the transmittance of the light regulating member when a backlight unit is on is higher than the transmittance of the light regulating member when the backlight unit is off.

7 Claims, 13 Drawing Sheets

(51) Int. Cl.
  *G02F 1/1334* (2006.01)
  *G02F 1/1335* (2006.01)
  *G02F 1/1347* (2006.01)
  *G02F 1/15* (2006.01)
  *G02F 1/1343* (2006.01)

(52) U.S. Cl.
  CPC ...... *G02F 1/13476* (2013.01); *G02F 1/13718* (2013.01); *G02F 1/133536* (2013.01); *G02F 1/1523* (2013.01); *G02F 2201/44* (2013.01)

(58) Field of Classification Search
  USPC .......................................................... 349/33
  See application file for complete search history.

(56) References Cited

U.S. PATENT DOCUMENTS

| 2005/0046321 A1 | 3/2005 | Suga et al. |
| 2007/0070004 A1 | 3/2007 | Yabuta et al. |
| 2009/0213147 A1 | 8/2009 | Sagardoyburu et al. |
| 2012/0256895 A1 | 10/2012 | Azumada et al. |

FOREIGN PATENT DOCUMENTS

| JP | 2004-117562 A | 4/2004 |
| JP | 2004-245976 A | 9/2004 |
| JP | 2005-164692 A | 6/2005 |
| JP | 2007-34051 A | 2/2007 |
| JP | 2007-121985 A | 5/2007 |
| JP | 2007-127724 A | 5/2007 |
| JP | 2009-217259 A | 9/2009 |
| JP | 2010-211084 A | 9/2010 |
| WO | WO 2011/080958 A | 7/2011 |

* cited by examiner

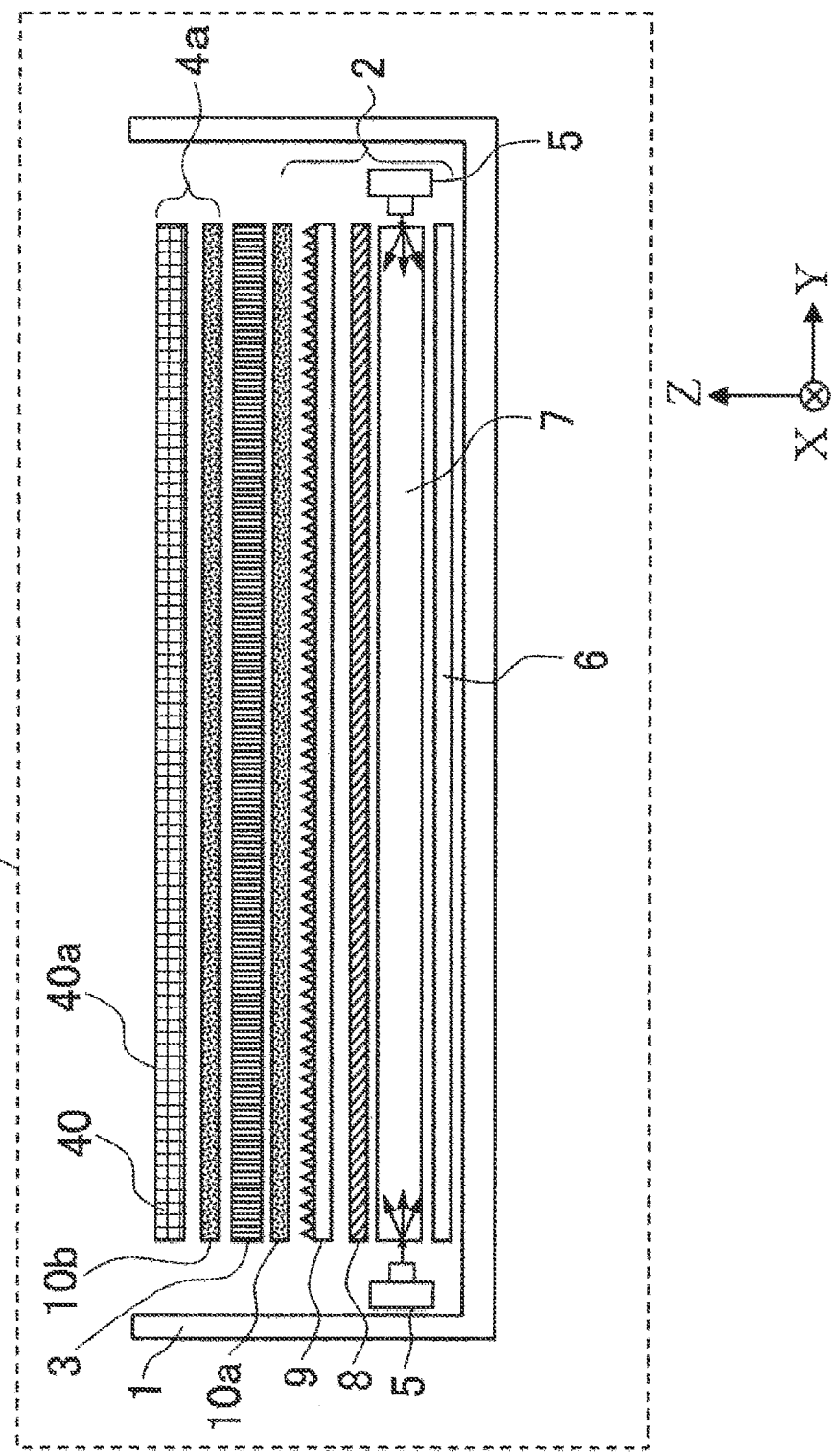

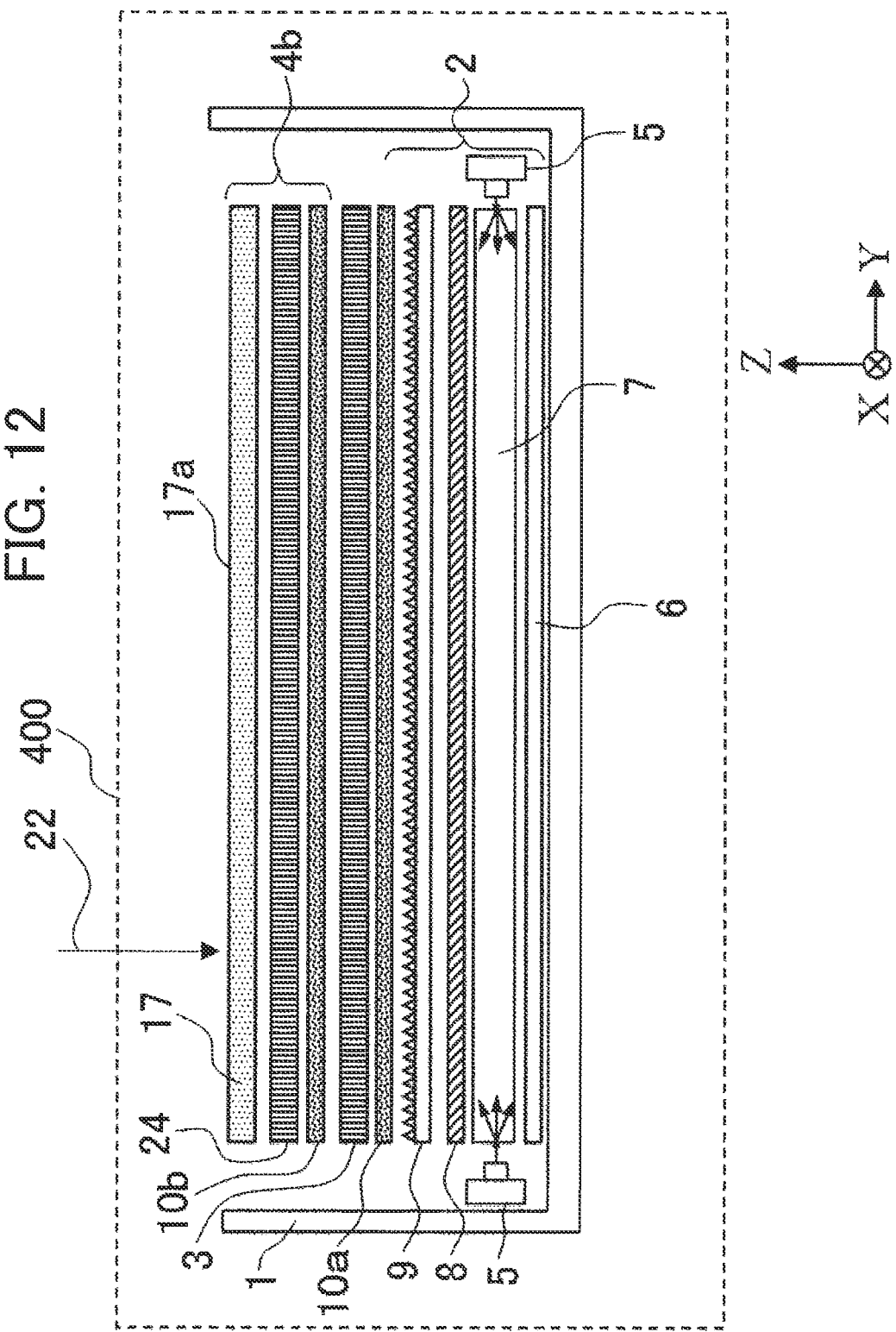

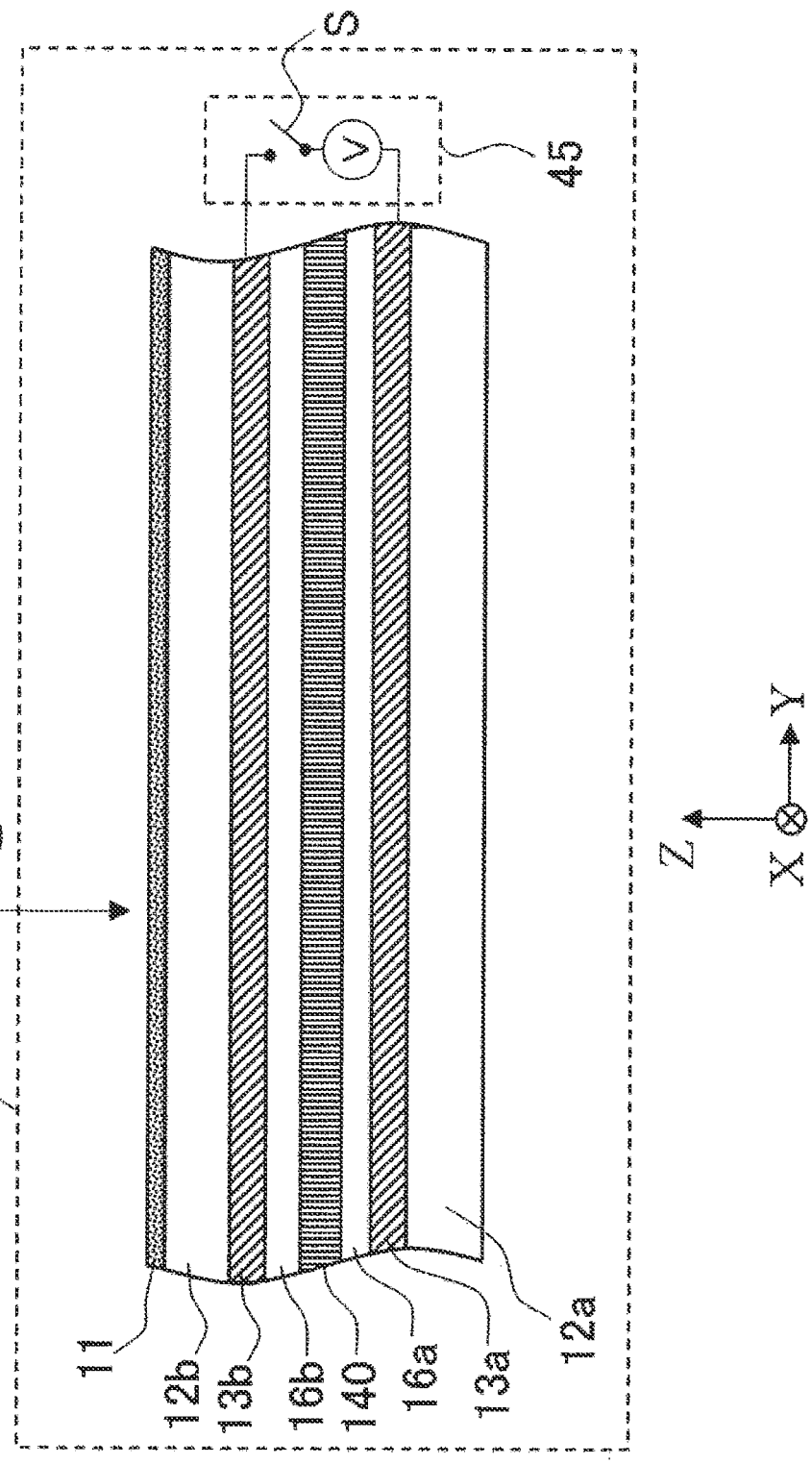

LIQUID CRYSTAL DISPLAY DEVICE

TECHNICAL FIELD

The present invention relates to the structure and control of a liquid crystal display device.

BACKGROUND ART

Conventional liquid crystal display devices have liquid crystal cells and backlights. The backlight is a planar light source device that supplies the liquid crystal cell with light in planar form. The component elements of the liquid crystal cell are formed in layers. The component elements of the liquid crystal cell are a polarizing plate, a glass plate, color filters, a liquid crystal layer, another glass plate, and another polarizing plate, arranged in this order from the display surface side (e.g., patent reference 1).

PRIOR ART REFERENCE

Patent Reference

Patent reference 1: Japanese Patent Application Publication No. 2004-117562 (paragraph 0011, paragraph 0012, FIG. 1)

SUMMARY OF THE INVENTION

Problems to be Solved by the Invention

The polarizing plates in conventional liquid crystal display devices transmit only light having an amplitude component in a particular direction. The remainder of the light is absorbed by iodine or the like inside the polarizing plate. Accordingly, when the backlights in conventional liquid crystal display devices are off, the display surface appears black, because external light is absorbed by the iodine or the like in the polarizing plate.

As a result of the increasing sizes that liquid crystal display devices have attained in recent years, however, there is a tendency for a display surface that turns black when no picture is displayed to be regarded with disfavor from the viewpoint of interior design.

The present invention is made to address this problem with the object of obtaining a liquid crystal display device with a display surface that does not turn black when no picture is displayed.

Means for Solving the Problem

The present invention provides a liquid crystal display device with: a liquid crystal cell member having a first liquid crystal layer in which the alignment of liquid crystal molecules is altered by application of a first voltage; a light regulating member disposed on the display surface side of the liquid crystal cell member, having an optical transmittance that is altered by the application state of a second voltage; a reflective polarizing member disposed between the light regulating member and the first liquid crystal layer, the reflective polarizing member transmitting specific polarized light and reflecting other polarized light; and a control unit for altering the application state of the second voltage. Light incident on the reflective polarizing member from the first liquid crystal layer has a polarization direction identical to the polarization direction of the light transmitted by the reflective polarizing member. The control unit alters the application state of the second voltage in such a manner that the transmittance of the light regulating member when the backlight unit is on is higher than the transmittance of the light regulating member when the backlight unit is off.

Effect of the Invention

With the present invention, it is possible to obtain a liquid crystal display device with a display surface that turns black to a lesser degree when no picture is being displayed on the liquid crystal display device.

BRIEF DESCRIPTION OF THE DRAWINGS

FIG. 11 is a structural drawing showing another example of the liquid crystal display device in the third embodiment.

FIG. 12 is a structural drawing illustrating a liquid crystal display device in a fourth embodiment.

FIG. 13 is a structural drawing illustrating a liquid crystal shutter in the fourth embodiment.

MODE FOR CARRYING OUT THE INVENTION

First Embodiment

To facilitate the description of the drawings, XYZ coordinates will be used below. A display surface of a liquid crystal display device has, for example, a rectangular shape. The short-side direction of the display surface will be designated as the X-axis direction; the long-side direction will be designated as the Y-axis direction; the direction perpendicular to the X-Y plane will be designated as the Z-axis direction. The display surface side of the liquid crystal display device 100 will be designated as the +Z-axis direction. The upward direction of the liquid crystal display device will be designated as the +X-axis direction. The right side as seen when facing the display surface of the liquid crystal display device 100 will be designated as the +Y-axis direction. 'Facing the display surface' means viewing the display surface of the liquid crystal display device from a facing position. In the following, the display surface of the liquid crystal display device will be referred to simply as 'the display surface'. The +Z-axis direction will be referred to as the 'front'. The −Z-axis direction will be referred to as the 'back'.

Figure 1:
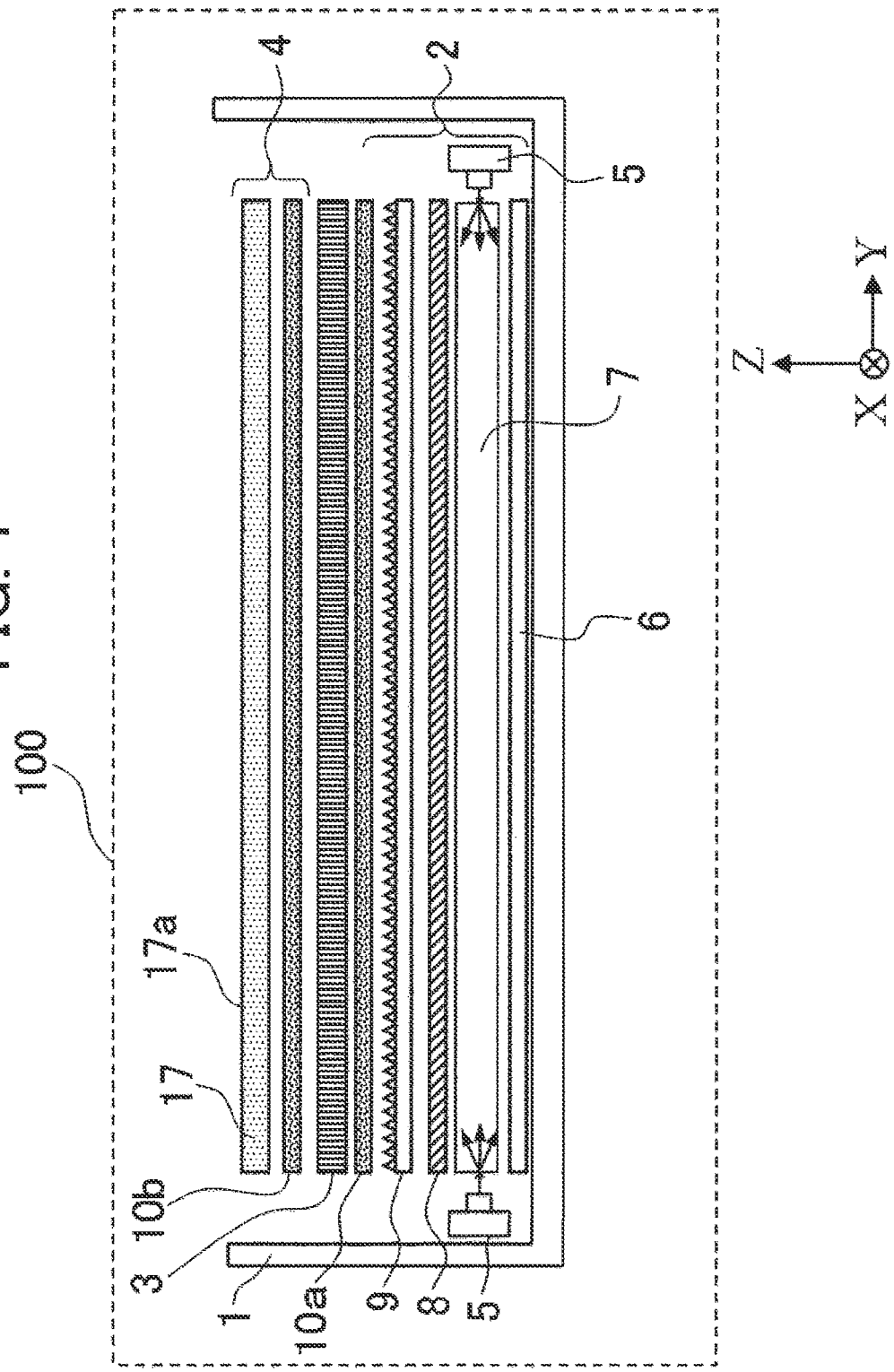
FIG. 1 is a structural drawing illustrating a liquid crystal display device in a first embodiment.

FIG. 1 is a structural drawing schematically illustrating a cross section of a liquid crystal display device 100 according to a first embodiment of the invention. The liquid crystal display device 100 includes a housing 1, a backlight unit 2, a liquid crystal cell 3, and a light regulating unit 4.

The backlight unit 2, liquid crystal cell 3, and light regulating unit 4 are included inside the housing 1. The backlight unit 2 is positioned behind the liquid crystal cell 3 (on its −Z-axis direction side) inside the housing 1. The liquid crystal cell 3 is positioned further toward the front surface 17a side (the +Z-axis direction side) than the backlight unit 2. The light regulating unit 4 is positioned further toward the front surface 17a side (the +Z-axis direction side) than the liquid crystal cell 3. The backlight unit 2, liquid crystal cell 3, and light regulating unit 4 are thus arranged in this order from the back surface side (the −Z-axis direction side) toward the front surface 17a side (the +Z-axis direction side). In this and the following embodiments, the 'front surface' is the outermost surface of the liquid crystal display device in the direction in which a picture is displayed. This is the surface of the liquid crystal display device that is farthest in the +Z-axis direction. The 'front side' means the 'front surface side'.

The backlight unit 2 includes a light source 5, a light guide plate 7, and a reflective polarizing film 10a. The backlight unit 2 may also include a reflective sheet 6, a diffusion film 8, or a brightness enhancement film 9. The light source 5 emits illumination light that illuminates the liquid crystal cell 3. The light source 5 emits light toward the light guide plate 7. The position of the light source 5 will be described later. 'Polarization' means a property in which light vibrates only in a specific direction. 'Polarized light' means light having a polarization property. The vibration directions of polarized light are regular.

The reflective sheet 6 is positioned closest to the back side (in the −Z-axis direction) of the backlight unit 2. The light guide plate 7 is positioned further toward the front surface 17a side (in the +Z-axis direction) than the reflective sheet 6. The reflective sheet 6 has the function of reflecting part of the light exiting the light guide plate 7 toward the front surface 17a side. That is, the reflective sheet 6 has the function of gathering light toward the front surface 17a side.

The diffusion film 8 is positioned further toward the front surface 17a side (in the +Z-axis direction) than the light guide plate 7. The diffusion film 8 has the function of diffusing and uniformizing transmitted light. The brightness enhancement film 9 is positioned further toward the front surface 17a side (in the +Z-axis direction) than the diffusion film 8. The brightness enhancement film 9 has the function of condensing light emitted from the light source 5 and increasing the frontal luminance on the front surface 17a side. The reflective polarizing film 10a is positioned further toward the front surface 17a side (in the +Z-axis direction) than the brightness enhancement film 9. The reflective polarizing film 10a has the function of transmitting only light vibrating in a certain direction and reflecting light vibrating in another direction.

The light regulating unit 4 includes a reflective polarizing film 10b and a light regulating film 17. The light regulating unit 4 has the function of transmitting, dimming, or blocking image light generated by the liquid crystal cell 3. 'Dimming' means reducing the intensity of the light. That is, it means that the picture displayed on the liquid crystal display device is darkened. In the first embodiment, the surface of the light regulating film 17 on the +Z-axis direction side is the front surface 17a. 'Image light' means light possessing image information. Image light is created in the liquid crystal cell 3. The surface on the +Z-axis direction side of the liquid crystal cell 3 is the picture display surface.

The light regulating film 17 is positioned further toward the front surface 17a side (in the +Z-axis direction) than the reflective polarizing film 10b. That is, the reflective polarizing film 10b is positioned further toward the back side (in the −Z-axis direction) than the light regulating film 17. In the light regulating unit 4, the light regulating film 17 is positioned closest to the front surface 17a side (in the +Z-axis direction). The reflective polarizing film 10b has the function of transmitting only light vibrating in a certain direction and reflecting light vibrating in another direction. The light regulating film 17 has the function of enabling the quantity of transmitted light to be changed by control of an electric field in the light regulating film.

Although various light source arrangement methods have been disclosed, the side-edge-lit arrangement will be described here as an example. The 'side-edge-lit arrangement' is an arrangement in which the light source is disposed on the side of a light guide plate made of a transparent material; rays of light emitted from the light source undergo repeated reflection while being guided inside the light guide plate until they emerge from the surface of the light guide plate. 'Emerge' means that the light escapes. 'Emerge from the surface' means that the light escapes from the surface. 'Being guided' means being led. Here it means that light that enters the light guide plate propagates along the interior of the light guide plate. The side-edge-lit arrangement is also referred to as the edge-lit arrangement, side-lit arrangement, or light guide plate arrangement.

The housing 1 has a rectangular shape as viewed from the +Z-axis direction. In the side-edge-lit method, multiple light sources 5 are disposed on a short side of the housing 1. The side-edge-lit method places the multiple light sources 5 facing the edge surface of a short side of the light guide plate 7. Although not shown in this drawing, the light sources 5 are attached to the housing 1 by metal supporting members that are operable to diffuse heat. 'Operable to diffuse heat' refers to the phenomenon of heat diffusion from a higher temperature region to a lower temperature region. By using metal supporting members to attach the light sources 5 to the housing 1, the liquid crystal display device 100 has the effect of efficiently dispersing heat generated by the light sources 5.

The performance of blue light emitting diodes (referred to below as LEDs) has improved remarkably in recent years. Along with this, white LEDs utilizing blue LED elements are being widely employed in light sources of backlight devices. A white LED includes a blue LED element and a yellow phosphor. The yellow phosphor absorbs blue light emitted from the blue LED element and emits yellow light. Yellow is a color that includes green and red, and is complementary to blue. A white LED therefore emits white light.

The light guide plate 7 has a rectangular shape. The light sources 5 are disposed facing the edge surface on a short side of the light guide plate 7. The light emitted from the light sources 5 enters the light guide plate 7 from the edge surface of the short side of the light guide plate 7. When surface 17a is the front surface, the surfaces facing in the horizontal and vertical directions on the front surface 17a are referred to as edge surfaces. In FIG. 1, the edge surfaces are the surfaces parallel to the YZ plane and the surfaces parallel to the ZX plane. The light guide plate 7 converts the light incident from the multiple light sources 5 to uniform planar light. More specifically, the light guide plate 7 uses a prismatic structure disposed on its back side (−Z-axis side) to convert the 'light beams' incident from the edge surface to 'uniform planar light', and then emits the light toward the front surface 17a (in the +Z-axis direction). That is, the light guide plate 7 acts as a surface light source that emits planar light. A 'surface light source' means a light source that emits light from its surface.

In general, light rays are reflected, refracted, scattered, or absorbed at an interface. Reflection of light at an interface is referred to as interface reflection. Due to interface reflection etc., some of the light exits the light guide plate 7 toward the back (in the −Z-axis direction). The reflective sheet 6 reflects this light and redirects its propagation direction toward the front surface 17a (in the +Z-axis direction). By reflecting the light, the reflective sheet 6 performs the function of gathering the light frontally, toward the front surface 17a.

The light exiting the light guide plate 7 toward the front surface 17a (in the +Z-axis direction) passes through the diffusion film 8, brightness enhancement film 9, and reflective polarizing film 10a and enters the liquid crystal cell 3. The brightness enhancement film 9 is disposed on the liquid crystal cell 3 side of (in the +Z-axis direction from) the light guide plate 7. The brightness enhancement film 9 condenses the light emitted from the light sources 5 and raises the frontal luminance of the front surface 17a. The frontal luminance of the front surface 17a can thereby be increased. To 'raise the frontal luminance of the front surface' means to redirect the light scattered by the diffusion film 8 so that it propagates in the direction perpendicular to the exit surface of the brightness enhancement film 9 (in the +Z-axis direction).

The light transmitted through the brightness enhancement film 9 enters the reflective polarizing film 10a. The reflective polarizing film 10a transmits only light vibrating in a certain single direction and reflects light vibrating in another direction. Ordinary polarizing plates transmit only light vibrating in a certain single direction and absorb light vibrating in another direction. Known examples of reflective polarizing films include multilayer films manufactured by the 3M Company in the U.S.A.

Other types of films, however, have been newly developed nowadays, including some using metal nanowire grids. A wire grid polarizer is a non-absorbing polarizer formed by depositing a metal material onto a substrate and forming a wire grid by nanometer-level fine etching. Since no organic material is used, superior tolerance of heat and light is obtained. The light reflected by the reflective polarizing film 10a is reflected repeatedly inside the backlight unit 2. Reflection inside the backlight unit 2 alters the polarization direction of the light reflected by the reflective polarizing film 10a so that it passes through the reflective polarizing film 10a.

Figure 2:
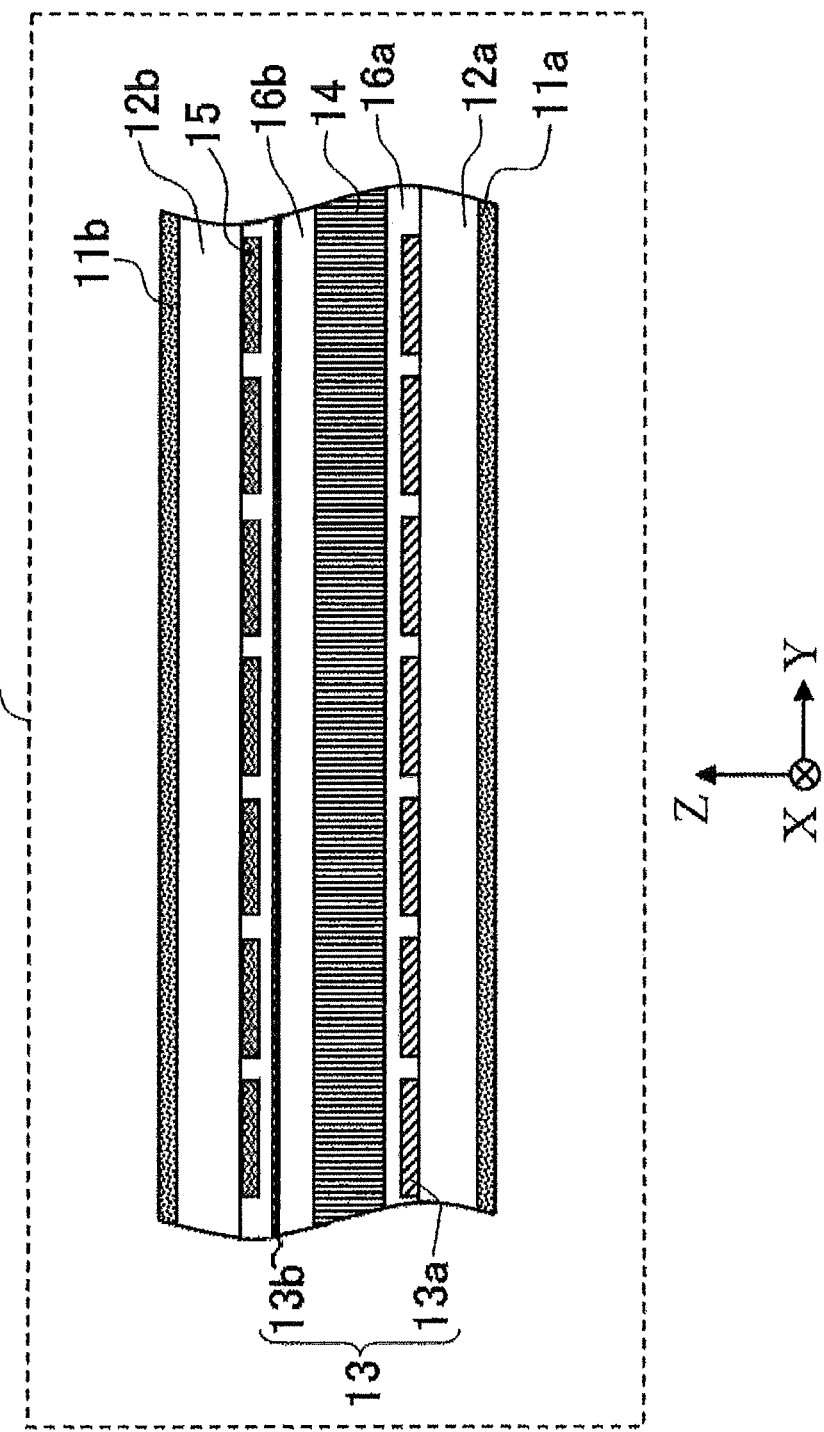
FIG. 2 is a structural drawing illustrating a liquid crystal cell in the first embodiment.

FIG. 2 is a structural drawing of the liquid crystal cell 3. The liquid crystal cell 3 includes polarizing plates 11a and 11b, glass plates 12a and 12b, alignment films 16a and 16b, transparent electrodes 13, a liquid crystal layer 14, and color filters 15. The transparent electrodes 13 include a transparent electrode 13a and a transparent electrode 13b.

The polarizing plate 11a is positioned on the back-most side of the liquid crystal cell 3 (in the −Z-axis direction). The glass plate 12a is positioned on the front surface 17a side of (in the +Z-axis direction from) the polarizing plate 11a. The alignment film 16a is positioned on the front surface 17a side of (in the +Z-axis direction from) the glass plate 12a. The transparent electrodes 13a are positioned in the layer occupied by the alignment film 16a. The liquid crystal layer 14 is positioned on the front surface 17a side of (in the +Z-axis direction from) the alignment film 16a. The alignment film 16b is positioned on the front surface 17a side of (in the +Z-axis direction from) the liquid crystal layer 14.

The transparent electrodes 13b are positioned on the front surface 17a side of (in the +Z-axis direction from) the alignment film 16b. The color filters 15 are positioned on the front surface 17a side of (in the +Z-axis direction from) the transparent electrodes 13b. The glass plate 12b is positioned on the front surface 17a side of (in the +Z-axis direction from) the color filters 15. The polarizing plate 11b is positioned on the front surface 17a side of (in the +Z-axis direction from) the glass plate 12b. The polarizing plate 11b is positioned closest to the front surface 17a (in the +Z-axis direction) in the liquid crystal cell 3. The polarizing plate 11a, glass plate 12a, transparent electrodes 13a, liquid crystal layer 14, alignment film 16b, transparent electrodes 13b, color filters 15, glass plate 12b, and polarizing plate 11b are thus arranged in this order from the −Z-axis direction toward the +Z-axis direction. The alignment film 16a is positioned in the same layer as the transparent electrodes 13a.

The alignment films 16 are grooved films. Both the alignment films 16a and 16b will be described as the alignment films 16. When the liquid crystal molecules make contact with the alignment films 16, the liquid crystal molecules realign themselves with the grooves. When the alignment films 16a and 16b are disposed on opposite sides of the liquid crystal layer 14 in such a way that the alignment of their grooves differs by 90 degrees, the liquid crystal molecules line up with a 90-degree twist. 'Align' means alignment of the liquid crystal molecules in a fixed direction.

The transparent electrodes 13 apply voltages to the liquid crystal layer 14. The voltages applied by the transparent electrodes 13 are applied across the transparent electrodes 13a and 13b. The transparent electrodes 13a and 13b will both be described as the transparent electrodes 13. The transparent electrodes 13 are made from a material that is transparent like glass. Therefore, the transparent electrodes 13 transmit light from the light sources 5. This also includes cases in which the transparent electrodes 13 are not themselves transparent but, for example, the width of the electrodes is too thin for them to be seen by a person viewing the liquid crystal display device 100.

The polarization direction of polarizing plate 11a is rotated in the X-Y plane by 90 degrees with respect to the polarization direction of polarizing plate 11b. Specifically, if the polarization direction of polarizing plate 11a is the X-axis direction, for example, then the polarization direction of polarizing plate 11b is the Y-axis direction. A 'polarizing plate' is a plate that transmits only light polarized in a specific direction. Here, 'polarized in the X-axis direction' means vertical polarization. 'Polarized in the Y-axis direction' means horizontal polarization. In the following description, as an example, the polarization direction of polarizing plate 11a is the X-axis direction (vertical polarization) and the polarization direction of polarizing plate 11b is the Y-axis direction (horizontal polarization).

The reflective polarizing film 10a transmits light polarized in the same direction as the polarizing plate 11a. That is, the polarization direction of reflective polarizing film 10a coincides with the polarization direction of polarizing plate 11a. The polarization direction of reflective polarizing film 10a will therefore be described as the X-axis direction (vertical polarization). The reflective polarizing film 10a is disposed inside the backlight unit 2. If the polarizing plate 11a is vertically polarized, the reflective polarizing film 10a is also vertically polarized. The polarizing plate 11a will be described below as vertically polarized. The light that passes through the reflective polarizing film 10a in the backlight unit 2 also passes through the polarizing plate 11a.

The light transmitted through the polarizing plate 11a propagates in alignment with the liquid crystal layer 14. First, the case in which the liquid crystal cell 3 employs a liquid crystal of the TN (Twisted Nematic mode) type will be described. The liquid crystal molecules of a TN liquid crystal are arranged in such a way that the alignment of the liquid crystal molecules is twisted by 90 degrees in the X-Y plane when no voltage is applied. That is, the liquid crystal molecules are aligned in the Y-axis direction on the −Z-axis direction side of the liquid crystal cell 3 and in the X-axis direction on the +Z-axis direction side of the liquid crystal cell 3.

When no voltage is applied to the transparent electrodes 13, the alignment of the liquid crystal molecules on the −Z-axis direction side of the liquid crystal layer 14 is rotated by 90 degrees in the X-Y plane (in the Y-axis direction) with respect to the polarization direction (X-axis polarization) of polarizing plate 11a. The alignment of the liquid crystal molecules on the +Z-axis direction side of the liquid crystal layer 14 is rotated by 90 degrees in the X-Y plane (in the X-axis direction) with respect to the polarization direction (Y-axis polarization) of polarizing plate 11b. The alignment of the liquid crystal molecules in the liquid crystal layer 14 thus rotates by 90 degrees in the X-Y plane, from the horizontal direction (Y-axis direction) to the vertical direction (X-axis direction).

The polarization direction of light propagating in alignment with the liquid crystal layer 14 from the −Z-axis direction side to the +Z-axis direction side is rotated by 90 degrees in the X-Y plane as it propagates through the liquid crystal layer 14. Therefore, light that has propagated in alignment with the liquid crystal layer 14 can pass through the polarizing plate 11b on the light regulating unit 4 side. Vertically polarized light can pass through a horizontally oriented liquid crystal layer. Horizontally polarized light can pass through a vertically oriented liquid crystal layer.

When a voltage is applied to the transparent electrodes 13, however, the twist between the liquid crystal molecules of the liquid crystal layer 14 and the light is released. That is, the liquid crystal molecules of the liquid crystal layer 14 are not in a state resulting from a 90-degree rotation in the X-Y plane. The alignment of the liquid crystal molecules of the liquid crystal layer 14 changes to the Z-axis direction. This causes the light entering the liquid crystal layer 14 from the −Z-axis direction to encounter only a small portion of the projected area of the liquid crystal molecules, so the vibration direction of the light scarcely changes at all. For this reason, the light cannot pass through the polarizing plate 11b (polarized in the Y-axis direction), which is placed with a rotation of 90 degrees in the X-Y plane with respect to the polarizing plate 11a (which is polarized in the X-axis direction).

Next, the case in which the liquid crystal cell employs a liquid crystal of the VA (Vertical Alignment mode) type will be described. A VA liquid crystal is a combination of liquid crystal molecules having a negative dielectric constant and a vertical alignment film. This causes the liquid crystal molecules to be placed at right angles to the polarizing plates 11a and 11b (in the Z-axis direction) when no voltage is applied.

When no voltage is applied to the transparent electrodes 13, the liquid crystal molecules in the liquid crystal layer 14 are arrayed at right angles with respect to the alignment films 16a, 16b. Incident light now encounters only a small portion of the projected area of the liquid crystal molecules, so the vibration direction of the light scarcely changes at all. Therefore, the light propagates unchanged through the liquid crystal layer 14 and cannot pass through the polarizing plate 11b positioned on the light regulating unit 4 side. That is, the light reaches polarizing plate 11b after propagating through the liquid crystal layer 14 without changing its vibration direction. For that reason, the light cannot pass through the polarizing plate 11b.

When a voltage is applied to the transparent electrodes 13, however, the liquid crystal molecules in the liquid crystal layer 14 are arranged parallel to the alignment films 16a, 16b. That is, the liquid crystal molecules lie down on the alignment films 16a, 16b. 'Lie down' means that they lie flat. As a result, the area that the liquid crystal molecules project toward the light increases. Due to the effect of the birefringence of the liquid crystal, the vibration direction of the light also changes. The light therefore passes through the polarizing plate 11b, whose polarization direction differs from that of the polarizing plate 11a by 90 degrees in the X-Y plane.

An IPS liquid crystal, an OCB liquid crystal, or the like may be used in the liquid crystal cell 3 shown in FIG. 2. A feature of an IPS liquid crystal is that the transparent electrodes 13 are disposed on only one side of the liquid crystal layer 14 and the presence or absence of an applied voltage determines whether or not its liquid crystal molecules turn to line up parallel to the front surface 17a. A feature of an OCB liquid crystal is a curved arrangement of the liquid crystal when no voltage is applied.

The light transmitted through the liquid crystal cell 3 enters the light regulating unit 4. The light regulating unit 4 includes the reflective polarizing film 10b and the light regulating film 17. The reflective polarizing film 10b is disposed behind the light regulating film 17 (in the −Z-axis direction). The quantity of light transmitted through the light regulating film 17 is altered by application of a voltage. A light regulating film 17 of the encapsulated liquid crystal type, for example, may be employed.

The reflective polarizing film 10b is similar to the reflective polarizing film 10a. The reflective polarizing film 10b is disposed inside the light regulating unit 4. The reflective polarizing film 10b has the feature that it does not absorb but reflects light whose polarization direction does not coincide with its own polarization direction. The light transmitted through the liquid crystal cell 3 that enters the reflective polarizing film 10b is polarized in the horizontal direction (the Y-axis direction) because of its passage through the polarizing plate 11b. The polarizing plate 11b is positioned on the light regulating unit 4 side in the liquid crystal cell 3.

The polarization direction of reflective polarizing film 10b coincides with the polarization direction of polarizing plate 11b. The polarization direction of polarizing plate 11b is horizontal (the Y-axis direction). The polarization direction of reflective polarizing film 10b is horizontal (the Y-axis direction). The light that passes through the liquid crystal cell 3 and strikes the reflective polarizing film 10b is not reflected by the reflective polarizing film 10b but passes through it.

External light is unpolarized light. External light passes through the light regulating film 17 from the front surface 17a side and arrives at the reflective polarizing film 10b. 'Unpolarized light' means light that does not have a regular vibration direction, but vibrates equally in all directions. The light all averages out, and is not polarized in any direction.

Fifty percent of the external light that arrives at the reflective polarizing film 10b from the front surface 17a side is therefore reflected by the reflective polarizing film 10b. The polarization direction of the reflected fifty percent of the light does not coincide with the polarization direction of reflective polarizing film 10b. The remaining fifty percent of the light passes through the reflective polarizing film 10b and propagates toward the liquid crystal cell 3 (in the −Z-axis direction).

Figure 3:
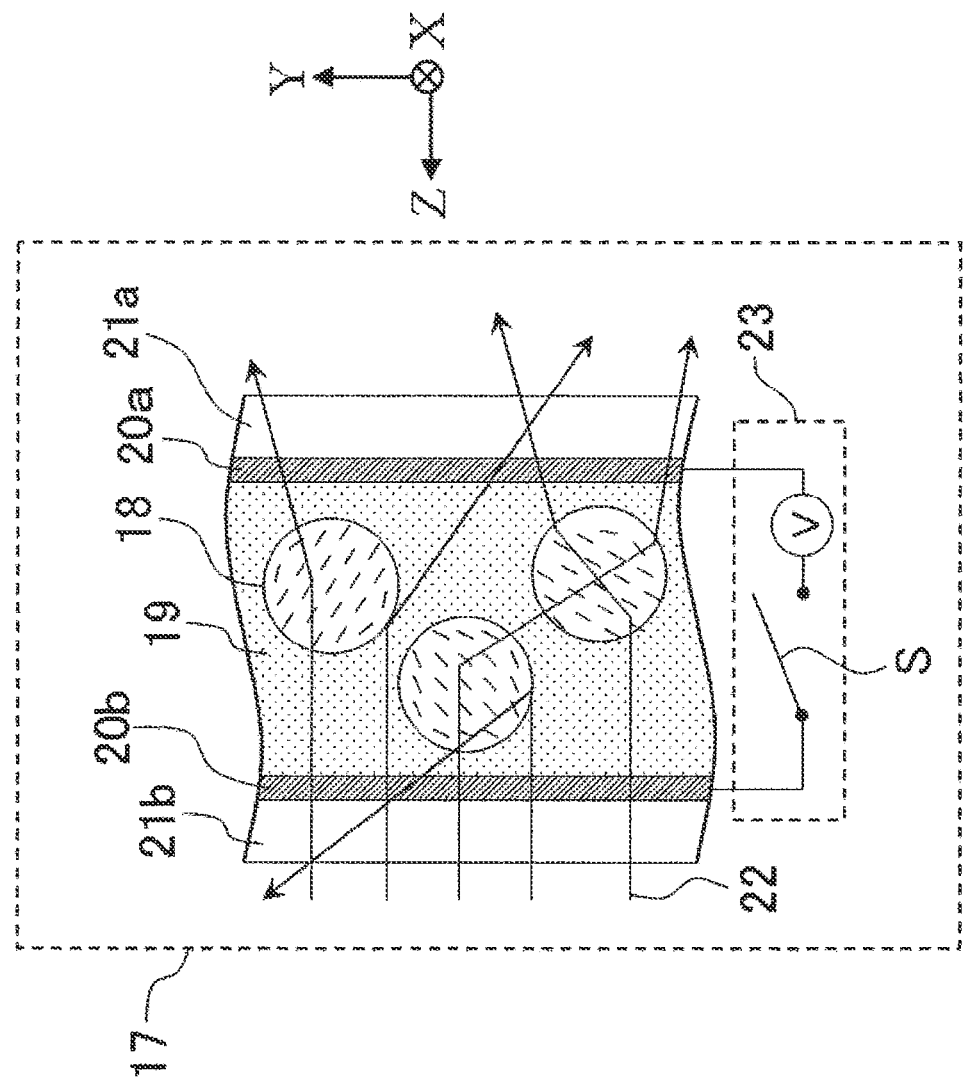
FIG. 3 is a structural drawing illustrating a light regulating film in the first embodiment.
Figure 4:
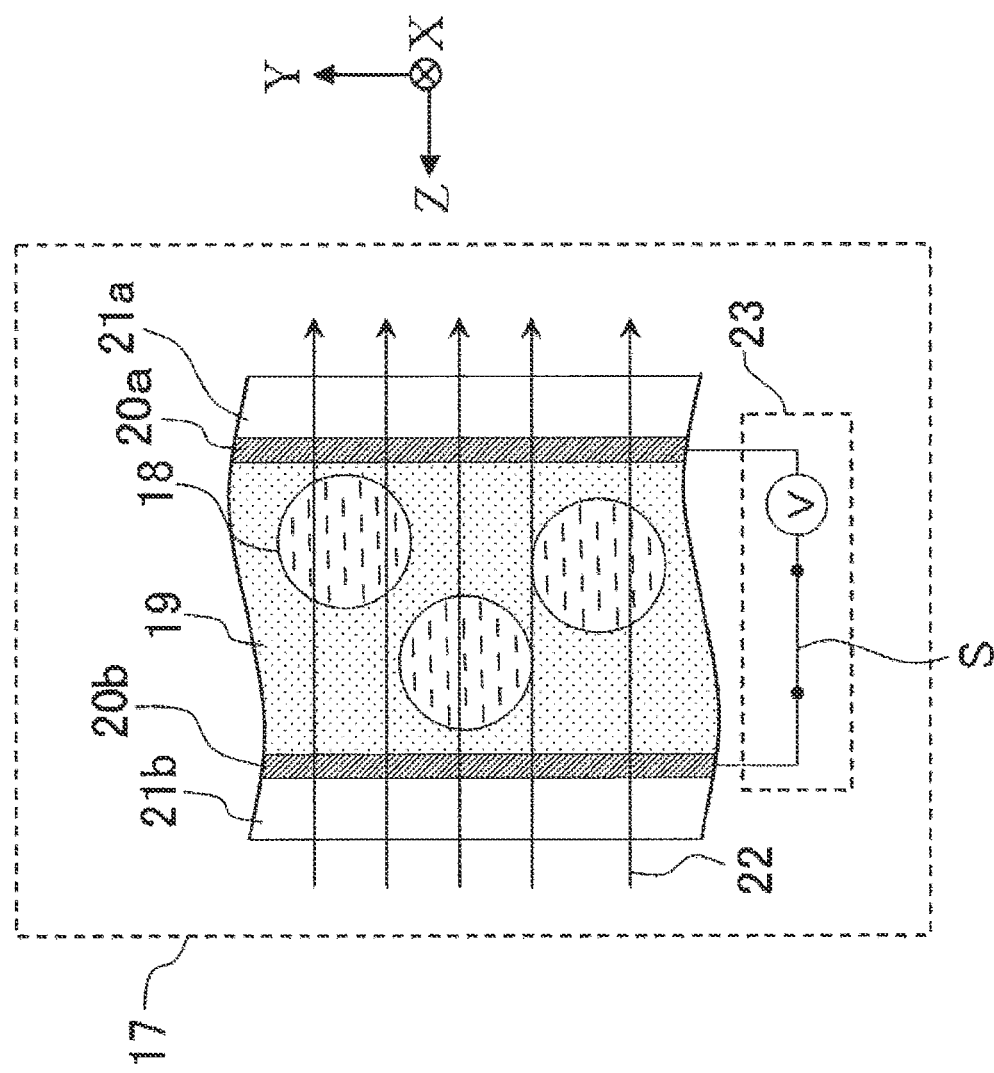
FIG. 4 is a structural drawing illustrating the light regulating film in the first embodiment.

FIGS. 3 and 4 are drawings showing an exemplary structure of the light regulating film 17 of the encapsulated liquid crystal type. The light regulating film 17 of the encapsulated liquid crystal type has a structure in which a polymer film 19 is interposed between transparent electrodes 20a and 20b. The polymer film 19 includes encapsulated liquid crystals 18. The encapsulated liquid crystals 18 have liquid crystal molecules enclosed in microcapsules made of plastic or some other material. The transparent electrode 20a is positioned on the back side (in the −Z-axis direction). The transparent electrode 20b is positioned on the front surface 17a side (in the +Z-axis direction).

The transparent electrodes 20a and 20b are interposed between a protective film 21a on the back side (in the −Z-axis direction) and a protective film 21b on the front surface 17a side (in the +Z-axis direction). That is, the protective film 21a is positioned behind (in the −Z-axis direction from) the transparent electrode 20a. The protective film 21b is positioned on the front surface 17a side of (in the +Z-axis direction from) the transparent electrode 20b.

The transparent electrodes 20 apply a voltage to the encapsulated liquid crystals 18. Both transparent electrodes 20a and 20b will be described as the transparent electrodes 20. The transparent electrodes 20 are made from a material that is transparent like glass. Accordingly, they transmit light from the light source 5. This also includes cases in which the transparent electrodes 20 are not themselves transparent but, for example, the width of the electrodes is too thin for them to be seen by a person viewing the liquid crystal display device 100.

The purpose of the protective films 21a and 21b is to electrically protect the interior of the light regulating film 17. Another purpose of the protective films 21a and 21b is to physically protect the interior of the light regulating film 17. For electrical protection, the protective films 21a and 21b are made of, for example, a transparent dielectric plastic. For physical protection, the functions of the plastic include protection against external pressure or prevention of the intrusion of moisture.

FIG. 3 shows the case in which no voltage is applied across the transparent electrodes 20a and 20b of the light regulating film 17. A control unit 23 includes a power source V and a switch S. In FIG. 3, the switch S, which is connected to the power source V, is open. One terminal of the power source V is connected to the transparent electrode 20a. The other terminal of the power source V is connected to one terminal of the switch S. The other terminal of the switch S is connected to the transparent electrode 20b. In FIG. 3, the power source V is turned on and off by the switch S. The power source V, however, has the function of continuously varying the voltage.

In the example in FIG. 3, that is, when no voltage is applied, the liquid crystal molecules in the encapsulated liquid crystals 18 have no fixed direction and are aligned at random. Therefore, due to the difference in the refractive indexes of the polymer film 19 and the liquid crystal molecules in the encapsulated liquid crystals 18 or to the birefringence of the liquid crystal molecules in the encapsulated liquid crystals 18, most of the external light 22 cannot travel straight and is scattered. 'Birefringence' is the property of having a refractive index that varies depending on the direction of incident light.

Some of the external light 22 passes through the light regulating film 17. More specifically, a few percent of the external light 22 passes through the light regulating film 17. That is, the fraction of the external light that is not scattered by the light regulating film 17 but passes through it is a few percent. 'External light that is not scattered but passes through' means external light that enters the light regulating film 17 but goes right through it without major modification of its optical path. After reflection from internal components and so on, a few percent of this external light emerges without being greatly scattered. Accordingly, the interior of the housing 1 is faintly visible through the back (the −Z-axis direction side) of the light regulating film 17. The quantity of reflected light is relatively greater, however, so the light regulating film 17 generally appears whitish. Overall, that is, the light regulating film 17 appears white. When a voltage is applied between the transparent electrodes 20a and 20b, the control unit 23 changes the state of the electric field in the light regulating film 17. That is, the control unit 23 alters the voltage application state of the transparent electrodes 20a and 20b.

The surface of the liquid crystal cell 3 (the surface on the +Z-axis direction side) is generally black. This is because light rays having polarization directions other than a specific polarization direction are absorbed by polarizing elements such as iodine molecules in the polarizing plate 11b. The polarizing plate 11b is disposed on the surface of the liquid crystal cell 3. Accordingly, if the light regulating film 17 were to be disposed directly on the front surface side of the liquid crystal cell 3, part of the external light 22 that passes through the light regulating film 17 would be absorbed by the polarizing plate 11b. This would cause the light regulating film 17 to appear darkly opalescent. 'Opalescent' refers to a slightly yellowish milky white.

The polarizing plates 11 transmit only light vibrating in a certain direction and absorb light vibrating in another direction. The polarizing plates 11 therefore have a blackish external appearance. The reflective polarizing films 10 also transmit only light vibrating in a certain direction, but they reflect light vibrating in the other direction. The reflective polarizing films 10 therefore have a mirror-like external appearance.

With the reflective polarizing film 10b disposed between the light regulating film 17 and liquid crystal cell 3, part of the external light 22 cannot travel straight and is scattered by the light regulating film 17. In addition, much of the external light 22 that passes through the light regulating film 17 is reflected by the reflective polarizing film 10b. This scattering and reflection causes the light regulating film 17 to appear brightly opalescent.

FIG. 4 shows the case in which a voltage is applied across the transparent electrodes 20a and 20b. When an electric potential is applied across the transparent electrodes 20a and 20b, the liquid crystal molecules in the encapsulated liquid crystals 18 align perpendicular to the transparent electrode 20a. For this reason, the external light 22 becomes able to travel straight without being scattered. That is, the light regulating film 17 becomes transparent. That enables the external light 22 to travel straight without being scattered.

The polarization direction of the reflective polarizing film 10b is identical to that of the polarizing plate 11b on the front surface 17a side of the liquid crystal cell 3 (in the +Z-axis direction). The light exiting the liquid crystal cell 3 therefore passes through the reflective polarizing film 10b almost without loss. That is, the light passes through the reflective polarizing film 10b with little loss. This allows the light that exits the liquid crystal cell 3 to pass through the reflective polarizing film 10b.

When a voltage is applied across the transparent electrodes 20a and 20b, much light cannot pass through the light regulating film 17 in the light regulating unit 4. Normally, the optical transmittance when parallel light rays are transmitted through the light regulating film 17 is seventy percent or more. This optical transmittance is significantly greater than the optical transmittance of the half mirror that will be described later. The optical transmittance of a half mirror is about fifty percent. Therefore, loss of brightness in the light regulating unit 4 can be held to a minimum.

That is, when the liquid crystal cell 3 is being made to display a picture, if the light regulating film 17 is made transparent by application of a voltage, the picture can be displayed normally. When the liquid crystal cell is not being made to display a picture, by not applying a voltage to the light regulating film 17, the display surface can be made opalescent. 'When the liquid crystal cell is not being made to display a picture' is when the liquid crystal display device 100 is not being used. 'Opalescent' is a slightly yellowish milky white color.

As a result of the above, it becomes possible, when a liquid crystal display device with a large display surface is placed in a room, to make the liquid crystal display device less obtrusive when not in use and thereby achieve harmony with interior decor. In addition, loss of light in the light regulating unit 4 is low, so the quantity of light put out by the backlight unit 2 can be reduced as compared with the conventional case.

For example, a type of liquid crystal display device has been developed in which a half mirror or the like is placed in front of the liquid crystal display device and the liquid crystal display device is used as a mirror when nothing is displayed, thereby avoiding having the display surface turn black when no picture is displayed. With this type of device, however, since the optical transmittance of the half mirror is low, in order to obtain the desired brightness, the quantity of light put out by the backlight must be increased. 'Half mirror' refers to, among mirrors that reflect part of the incident light and transmit the remaining light, a type in which the quantity of reflected light and the quantity of transmitted light are substantially the same. In the present invention, the light regulating film 17 appears mirror-like when the liquid crystal display device 100 is in a non-displaying condition. The light regulating film 17 appears glass-like when the liquid crystal display device 100 is in a displaying condition. The liquid crystal display device 100 of this invention, which eliminates the need to increase the quantity of light put out by the backlight unit 2, is advantageous from the viewpoint of power conservation.

With the type of liquid crystal display device that becomes a mirror when not in use, if the liquid crystal display device has a large screen, it becomes a large mirror, so its installation location is restricted. From the viewpoint of interior design, the liquid crystal display device 100 of this invention, whose display surface turns opalescent when not in use, is preferable to a liquid crystal display device with a half mirror arrangement.

The first embodiment has been described with a structure using the polarizing plate 11b and reflective polarizing film 10b. This is because the liquid crystal cell 3 is often treated as a single component and a structure in which the reflective polarizing film 10b is newly added to it is comparatively easy to implement. However, instead of using the polarizing plate 11b, the reflective polarizing film 10b may be disposed on the front surface 17a side of (in the +Z-axis direction from) the glass plate 12b. In this case, the polarization direction of reflective polarizing film 10b depends on the alignment of the liquid crystal molecules in the liquid crystal layer 14 and the polarization direction of polarizing plate 11a. For example, for a VA liquid crystal, the polarization direction of reflective polarizing film 10b need only form a right angle in the X-Y plane with the polarization direction of polarizing plate 11a.

That is, when a picture is displayed, the polarization direction of the light exiting the liquid crystal layer 14 toward the reflective polarizing film 10b need only coincide with the polarization direction of reflective polarizing film 10b. This enables the light for displaying the picture to pass through the reflective polarizing film 10b without loss. When their polarization directions do not coincide, part of the light (image light) for displaying the picture cannot pass through the reflective polarizing film 10b, darkening the picture.

Use of the reflective polarizing film 10b in place of the polarizing plate 11b can reduce the number of components. This can facilitate assembly. The manufacturing cost can also be reduced. Since the number of optical components is reduced, loss of light due to absorption or scattering of light is reduced. An energy conservation effect can thus be obtained. When a liquid crystal display device with a large screen is placed in a room, the obtrusiveness of the liquid crystal display device when not in use can be reduced, achieving harmony with interior decor.

The liquid crystal display device 100 has a liquid crystal cell member 3, a light regulating member 17, a reflective polarizing member 10b, and a control unit 23. The liquid crystal cell member 3 has a first liquid crystal layer 14 in which the alignment of liquid crystal molecules is altered by application of a first voltage. The light regulating member 17 is disposed on the display surface side of the liquid crystal cell member 3, and its optical transmittance is altered by the application state of a second voltage. The reflective polarizing member 10b, which is disposed between the light regulating member 17 and the first liquid crystal layer 14, transmits specific polarized light and reflects other polarized light. The control unit 23 alters the application state of the second voltage. Light incident on the reflective polarizing member 10b from the first liquid crystal layer 14 has a polarization direction identical to the polarization direction of the light transmitted by the reflective polarizing member 10b. The control unit 23 alters the application state of the second voltage in such a manner that the transmittance of the light regulating member 17 when the backlight unit 2 is on is higher than the transmittance of the light regulating member 17 when the backlight unit 2 is off.

In the first embodiment, the liquid crystal cell member 3 is described as the liquid crystal cell 3. In addition, the light regulating member 17 is described as the light regulating film 17. It is not always necessary, however, for the light regulating member 17 to be a film. The light regulating member 17 may be, for example, a plate-like member. The reflective polarizing member 10b has also been described as the reflective polarizing film 10b. It is not always necessary, however, for the reflective polarizing member 10b to be a film. The reflective polarizing member 10b may be, for example a plate-like member.

The liquid crystal display device 100 also has a polarizing member 11b for transmitting specific polarized light and absorbing other polarized light between the first liquid crystal layer 14 and the reflective polarizing member 10b.

The polarization direction of the reflective polarizing member 10b is identical to the polarization direction of this polarizing member 11b.

The light regulating member 17 has an encapsulated liquid crystal structure in which a polymer film including encapsulated liquid crystals is disposed between a plurality of transparent electrodes.

The control unit 23 raises the transmittance of the light regulating member 17 after a picture is displayed on the liquid crystal cell member 3, and alters the application state of the second voltage in such a manner that the transmittance of the light regulating member 17 is lowered simultaneously with the stopping of the display of the picture on the liquid crystal cell member 3.

Second Embodiment

Figure 5:
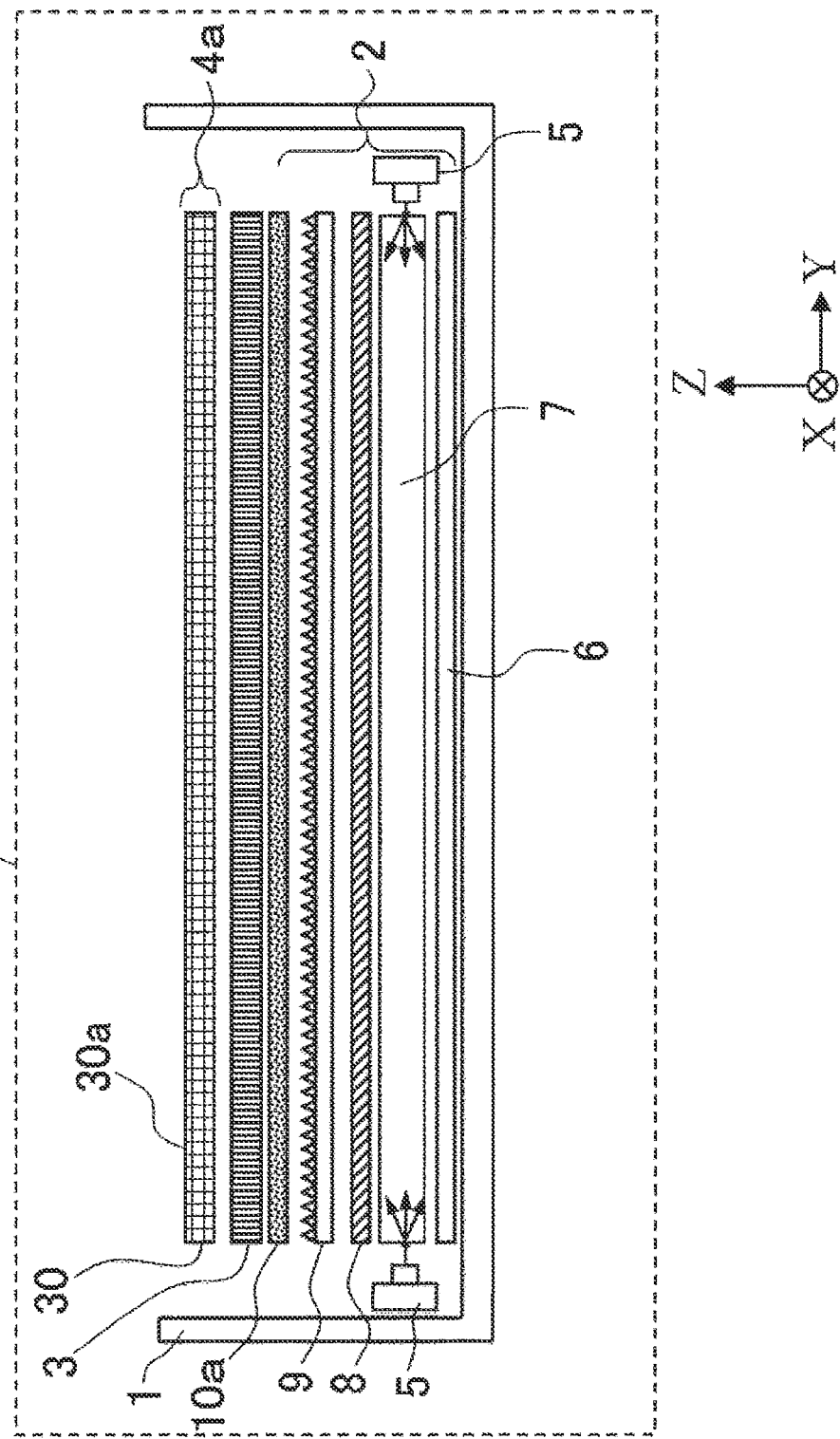
FIG. 5 is a structural drawing illustrating a liquid crystal display device in a second embodiment.

FIG. 5 is a structural drawing schematically showing a cross section of a liquid crystal display device 200 in a second embodiment of the invention. The liquid crystal display device 200 includes a housing 1, a backlight unit 2, a liquid crystal cell 3, and a light regulating unit 4a. Components that are the same as in the structural drawing of the liquid crystal display device 100 in the first embodiment above will not be described; the description will focus on the differences. The components that are the same as in the first embodiment are the housing 1, backlight unit 2, and liquid crystal cell 3. The front surface corresponding to the front surface 17a in the first embodiment is a surface 30a in the second embodiment. The 'front surface' is the outermost surface of the liquid crystal display device in the direction in which a picture is displayed. This is the surface of the liquid crystal display device that is farthest in the +Z-axis direction. The 'front side' means the 'front surface side'. The description will make use of the same XYZ coordinates as in the first embodiment.

The backlight unit 2, liquid crystal cell 3, and light regulating unit 4a are included inside the housing 1. The backlight unit 2 is disposed inside the housing 1. The backlight unit 2 is positioned at the back of the housing 1 (the −Z-axis direction side). The liquid crystal cell 3 is positioned further toward the front surface 30a side (the +Z-axis direction side) than the backlight unit 2. The light regulating unit 4a is positioned further toward the front surface 30a side (the +Z-axis direction side) than the liquid crystal cell 3. The backlight unit 2, liquid crystal cell 3, and light regulating unit 4a are thus arranged in this order from the back surface (the −Z-axis direction side) toward the front surface 30a (the +Z-axis direction side).

The individual structures and functions of the backlight unit 2 and liquid crystal cell 3 are the same as in the first embodiment. Descriptions of those components will therefore be omitted. Light transmitted through the liquid crystal cell 3 enters the light regulating unit 4a. The light regulating unit 4a has an electrochromic film 30 as a light regulating film. The electrochromic film 30 includes an electrochromic material. An electrochromic material is a material displaying the property that an electrochemical oxidation-reduction reaction of the material takes place when a voltage is applied and the oxidation-reduction reaction changes the color of the material. Tungsten oxide ($WO_3$), for example, is used as the electrochromic material of the electrochromic film 30.

Figure 6:
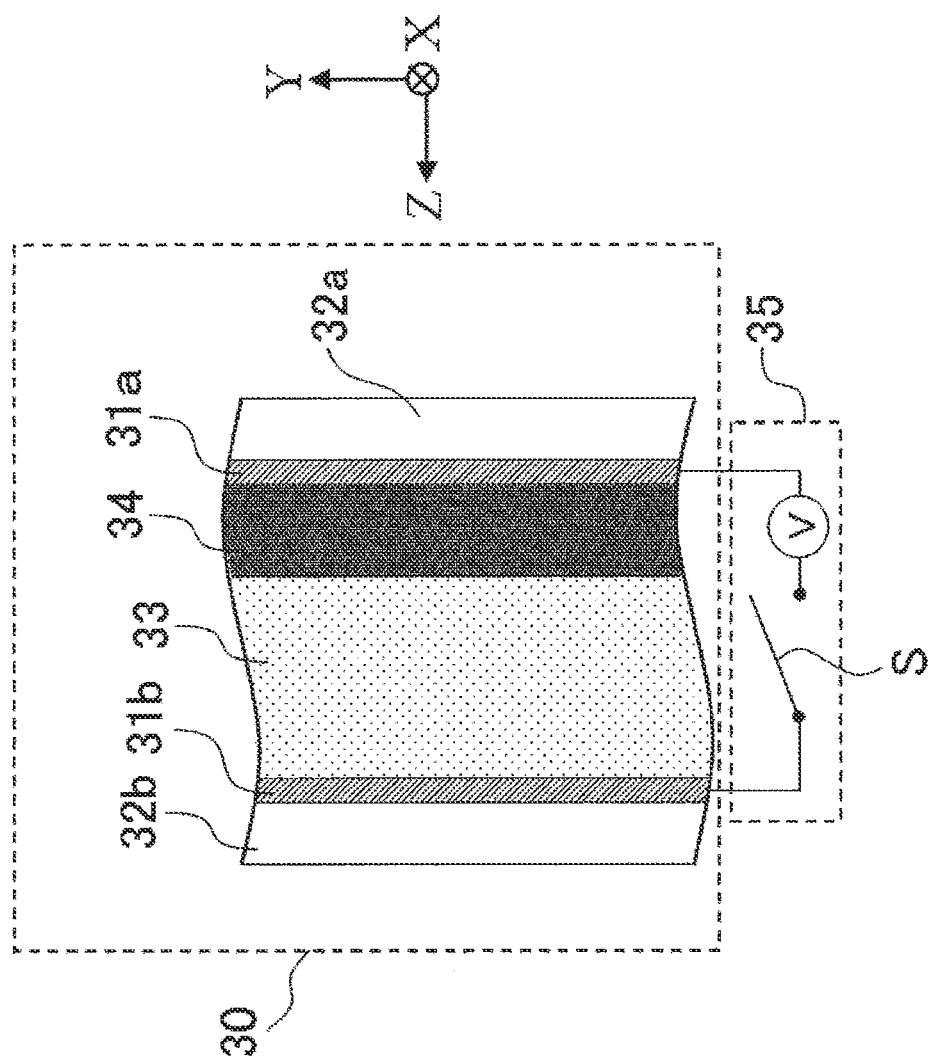
FIG. 6 is a structural drawing illustrating an electrochromic film in the second embodiment.

FIG. 6 is a schematic drawing showing an example of the structure of the electrochromic film 30. Tungsten oxide ($WO_3$) is used here as an exemplary electrochromic material 34. The electrochromic film 30 includes a protective film 32a, a transparent electrode 31a, the electrochromic material 34, an electrolyte 33, a transparent electrode 31b, and a protective film 32b. The protective film 32a is positioned at the back of the electrochromic film 30 (the −Z-axis direction side). The transparent electrode 31a is positioned further toward the front surface 30a side (the +Z-axis direction side) than the protective film 32a. The electrochromic material 34 is positioned further toward the front surface 30a side (the +Z-axis direction side) than the transparent electrode 31a. The electrolyte 33 is positioned further toward the front surface 30a side (the +Z-axis direction side) than the electrochromic material 34. The transparent electrode 31b is positioned further toward the front surface 30a side (the +Z-axis direction side) than the electrolyte 33. The protective film 32b is positioned further toward the front surface 30a side (the +Z-axis direction side) than the transparent electrode 31b. The protective film 32a, transparent electrode 31a, electrochromic material 34, electrolyte 33, transparent electrode 31b, and protective film 32b are thus arranged in this order from the back surface side (the −Z-axis direction side) toward the front surface 30a side (the +Z-axis direction side).

A control unit 35 alters the voltage applied to the transparent electrodes 31a and 31b of the electrochromic film 30. The control unit 35 includes a power source V and a switch S. In FIG. 6, the switch S, which is connected to the power source V, is open. One terminal of the power source V is connected to the transparent electrode film 31a. The other terminal of the power source V is connected to one terminal of the switch S. The other terminal of the switch S is connected to the transparent electrode film 31b. In FIG. 6, the power source V is turned on and off by the switch S. The power source V, however, has the function of continuously varying the voltage.

The transparent electrodes 31a and 31b are made from a material that is transparent like glass. Accordingly, the transparent electrodes 31a and 31b transmit light from the light sources. In some cases the transparent electrodes 31a and 31b are not transparent themselves. These include, for example, cases in which the transparent electrodes are not themselves transparent, but the width of the electrodes is too thin for them to be seen by a person viewing the liquid crystal display device 200.

The purpose of the protective films 32a and 32b is to electrically protect the interior of the electrochromic film 30. Another purpose of the protective films 32a and 32b is to physically protect the interior of the electrochromic film 30. For electrical protection, the protective films 32a and 32b are made of, for example, a transparent dielectric plastic. For physical protection, the functions of the protective films 32a and 32b include protection against external pressure or prevention of the intrusion of moisture.

The case in which tungsten oxide ($WO_3$) is used as the electrochromic material 34 will now be described. Tungsten oxide ($WO_3$) displays the property of changing color due to an oxidization-reduction reaction. Tungsten oxide ($WO_3$) is transparent or pale yellow, but electrical reduction causes it to capture ions and turn dark blue.

When the electrochromic material undergoes an oxidation-reduction reaction, the electrolyte 33 supplies the electrochromic material 34 with ions. Electrolytes are classified as liquid electrolytes or solid electrolytes. A liquid electrolyte offers a fast response, but has the problem of leaking. 'Leaking' means that the electrolyte is exposed outside the package. In order to prevent such liquid leakage, a complex packaging process is necessary. The 'packaging process' is the process of sealing the liquid electrolyte. A solid electrolyte, because of its properties as a solid, has lower ion conductivity. A low ion conductivity leads to a poorer response to changes in the applied voltage. Use of a gel-like polymer electrolyte improves the response as compared with a solid electrolyte. The electrolyte 33 will be described here as a solid electrolyte.

Next, the features of the electrochromic film 30 using tungsten oxide ($WO_3$) will be described with reference to FIG. 6. The control unit 35 applies a voltage such that the transparent electrode 31a is at a negative potential with respect to the transparent electrode 31b. The transparent electrode 31a contacts the tungsten oxide ($WO_3$). The tungsten oxide ($WO_3$) is the electrochromic material 34. The transparent electrode 31a is supplied with ions from the electrolyte 33. That is, ions migrate from the electrolyte 33 toward the transparent electrode 31a. The ions are positively charged. This induces a reduction reaction in the electrochromic material 34, causing the electrochromic material 34 to change color and assume a colored state.

After the electrochromic material 34 assumes the colored state, the circuit is opened to stop the application of voltage by the control unit 35. When this is done the electrochromic material 34 maintains the colored state. The colored state of the electrochromic material 34 has a memory property. 'Memory' means remembering. A 'memory property' is the property of remembering. Applying a reverse voltage to the electrochromic material 34 induces an oxidation reaction that causes the electrochromic material 34 to return to its initial (transparent) state. Alternatively, short-circuiting the transparent electrodes 31a, 31b induces an oxidation reaction in the electrochromic material 34, causing the electrochromic material 34 to return to its initial (transparent) state.

The operation of the electrochromic film 30 will now be described. The state in which the liquid crystal cell 3 is not illuminated by light from the backlight unit 2 is the state in which the power source of the backlight unit 2 is switched off. In the state in which the power source of the backlight unit 2 is switched off, the control unit 35 applies a voltage to the electrochromic film 30 to induce a reduction reaction. Applying a voltage that induces a reduction reaction causes the electrochromic film 30 to assume a dark blue colored state. In the state in which the backlight unit 2 is off, the electrochromic film 30 is thus in a dark blue colored state due to a reduction reaction.

Next, in the state in which light from the backlight unit 2 is fed into the liquid crystal cell 3, the switch of the power source of the backlight unit 2 is closed. In the state in which the switch of the power source of the backlight unit 2 is closed, the control unit 35 applies a voltage to the electrochromic film 30 to induce an oxidation reaction. Applying a voltage that induces an oxidation reaction causes the electrochromic film 30 to assume a transparent state. That is, in the state in which the backlight unit 2 is on, the electrochromic film 30 is in a transparent state due to an oxidation reaction.

Application of the voltage that makes the electrochromic film 30 turn transparent is preferably delayed by about ten to several tens seconds from input of a picture output signal to the liquid crystal cell 3. The reason for delaying the voltage change is to have the electrochromic film 30 turn transparent after the power source of the backlight unit 2 has been switched on and light that has passed through the liquid crystal cell 3, on which a picture is being displayed, enters the light regulating unit 4. That is, the electrochromic film 30 turns transparent after the light regulating unit 4 has assumed the state in which a picture is displayed on it. This prevents the electrochromic film 30 from turning transparent in the state in which no picture is displayed on the light regulating unit 4.

'The state in which the electrochromic film 30 turns transparent' refers to a state in which its transmittance rises higher than in the colored state, so that the electrochromic film 30 has a transmittance of 70 percent or more. In the state in which the electrochromic film 30 is transparent, that is, brightness reduction in the light regulating unit 4 can be held to a minimum. Therefore, when the electrochromic film 30 is in the transparent state, a picture can be displayed on the liquid crystal display device 200 in the normal way.

When input of a picture output signal to the liquid crystal cell 3 ceases, simultaneously with the end of the input of the picture output signal, the control unit 35 applies a voltage to the electrochromic film 30 to induce a reduction reaction. Accordingly, as soon as light stops being fed into the light regulating unit 4a, the electrochromic film 30 assumes a colored state. 'Light stops being fed' means that the backlight unit 2 is turned off.

The electrochromic film 30 consequently has a light regulating function similar to that of the light regulating film 17 in the first embodiment. A 'light regulating function' means a function by which light is either transmitted or scattered. Thus when a liquid crystal display device with a large screen is placed in a room, use of the electrochromic film 30 can make the liquid crystal display device less obtrusive when not in use. Use of the electrochromic film 30 can also harmonize the liquid crystal display device with interior decor.

When colored, the electrochromic film 30 turns dark blue. This enables the electrochromic film 30 to be used in color schemes requiring a color other than the dark opalescent color mentioned in the first embodiment. The front surface 30a has a dark color because there is no reflective polarizing film 10b positioned behind the electrochromic film 30 (on the −Z-axis direction side). If there were a reflective polarizing film 10b behind the electrochromic film 30 (on the −Z-axis direction side), the front surface 30a would have a bright color.

The exemplary structure described above uses tungsten oxide ($WO_3$) as the electrochromic material 34. The electrochromic material 34, however, is not limited to tungsten oxide ($WO_3$). For example, heptyl-viologen, a viologen compound, turns reddish purple in the reduced state and transparent in the oxidized state.

Tungsten oxide ($WO_3$) takes on color when a voltage is applied. A type of electrochromic material that becomes transparent when a voltage is applied can be used, however, to eliminate the need for voltage application when the liquid crystal display device 200 is not in use.

In the liquid crystal display device 200 in the second embodiment of the invention, the color in the colored state can be changed by changing the type of electrochromic material 34. The transparent electrode 31a, electrochromic material 34, electrolyte 33, and transparent electrode 31b are configured in multiple layers between the protective film 32a and protective film 32b in the liquid crystal display device 200. This enables the mixing of arbitrary colors.

The mixing of arbitrary colors can enhance the degree of freedom in interior design. Exemplary types of electrochromic materials that become transparent when a voltage is applied include iridium oxide and Prussian blue. Iridium oxide is transparent in the reduced state and turns dark blue in the oxidized state. Prussian blue is transparent in the reduced state and turns blue in the oxidized state.

In the above structure, the electrolyte 33 is a solid electrolyte. The choice of an electrolyte for electrolyte 33, however, depends on its compatibility with the type of electrochromic material, or on the type of application in which the device will be used. Accordingly, the electrolyte 33 is not limited to a solid electrolyte. To obtain a better response, a liquid electrolyte or a gel electrolyte may also be used for the electrolyte 33.

Since the control unit 35 operates as described above, the light regulating unit 4a becomes transparent after the liquid crystal cell 3 is already displaying a picture. The picture is visible through the light regulating unit 4a from the outside (the +Z direction). When the display of the picture by the liquid crystal cell 3 stops, the light regulating unit 4 simultaneously becomes colored. As a result, the liquid crystal display device 200 appears in harmony with interior decor. If the backlight unit 2 feeds in light before a picture signal is displayed on the liquid crystal cell 3, the internal structure of liquid crystal display device 200 might become visible from the outside (the +Z direction). Since the light regulating unit 4 is colored, the problem of the internal structure of liquid crystal display device 200 being visible from the outside (the +Z direction) does not occur. The liquid crystal display device 200 can harmonize with interior decor without being excessively obtrusive when not in use.

Figure 7:
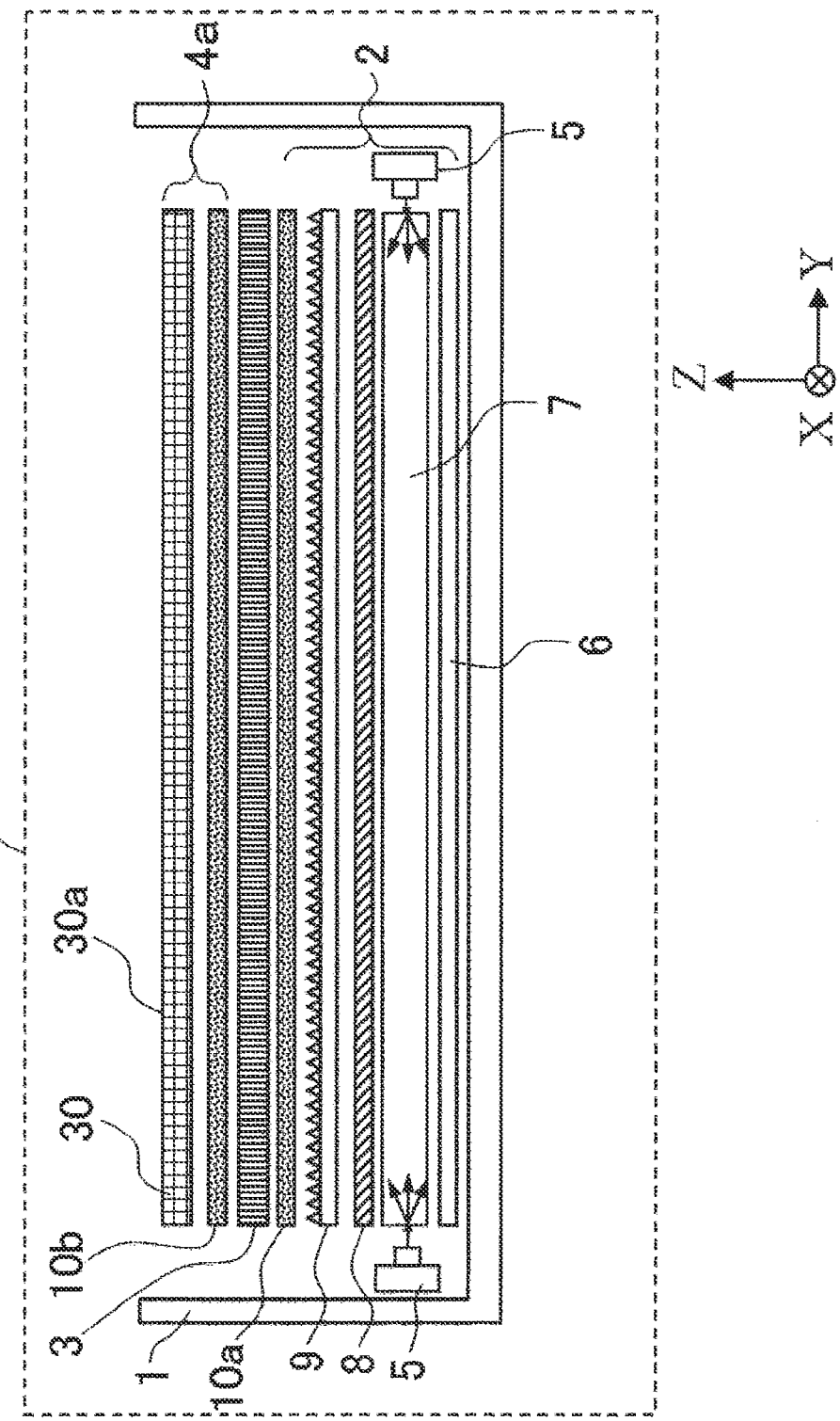
FIG. 7 is a structural drawing showing another example of the liquid crystal display device in the second embodiment.

FIG. 7 is a structural drawing of a liquid crystal display device 200a. The liquid crystal display device 200a shown in FIG. 7 differs from the liquid crystal display device 200 shown in FIG. 6 in that it includes a reflective polarizing film 10b. In the structure of liquid crystal display device 200, the light regulating unit 4a uses only the electrochromic film 30 as a light blocking means. However, there are also some electrochromic materials 34 that exhibit such high transparency that even when colored, the degree of coloration is insufficient and they can be seen through to the back (the −Z-axis direction side). That is, the light reflecting function of the electrochromic film 30 is inadequate in these cases.

As a countermeasure, the liquid crystal display device 200a places the reflective polarizing film 10b described in the first embodiment between the liquid crystal cell 3 and electrochromic film 30. That is, the reflective polarizing film 10b is positioned further toward the +Z side than the liquid crystal cell 3. The reflective polarizing film 10b is also positioned further toward the −Z side than the electrochromic film 30. This structure enables the liquid crystal display device 200a to harmonize with interior decor without being excessively obtrusive when not in use.

As in the first embodiment, a structure in which the reflective polarizing film 10b, instead of the polarizing plate 11b, is disposed on the front surface 30a side (the +Z-axis direction) of the glass plate 12b in the liquid crystal cell 3 can also produce the same effects.

The light regulating members 30 in the liquid crystal display devices 200 and 200a employ an electrochromic material.

Third Embodiment

Figure 8:
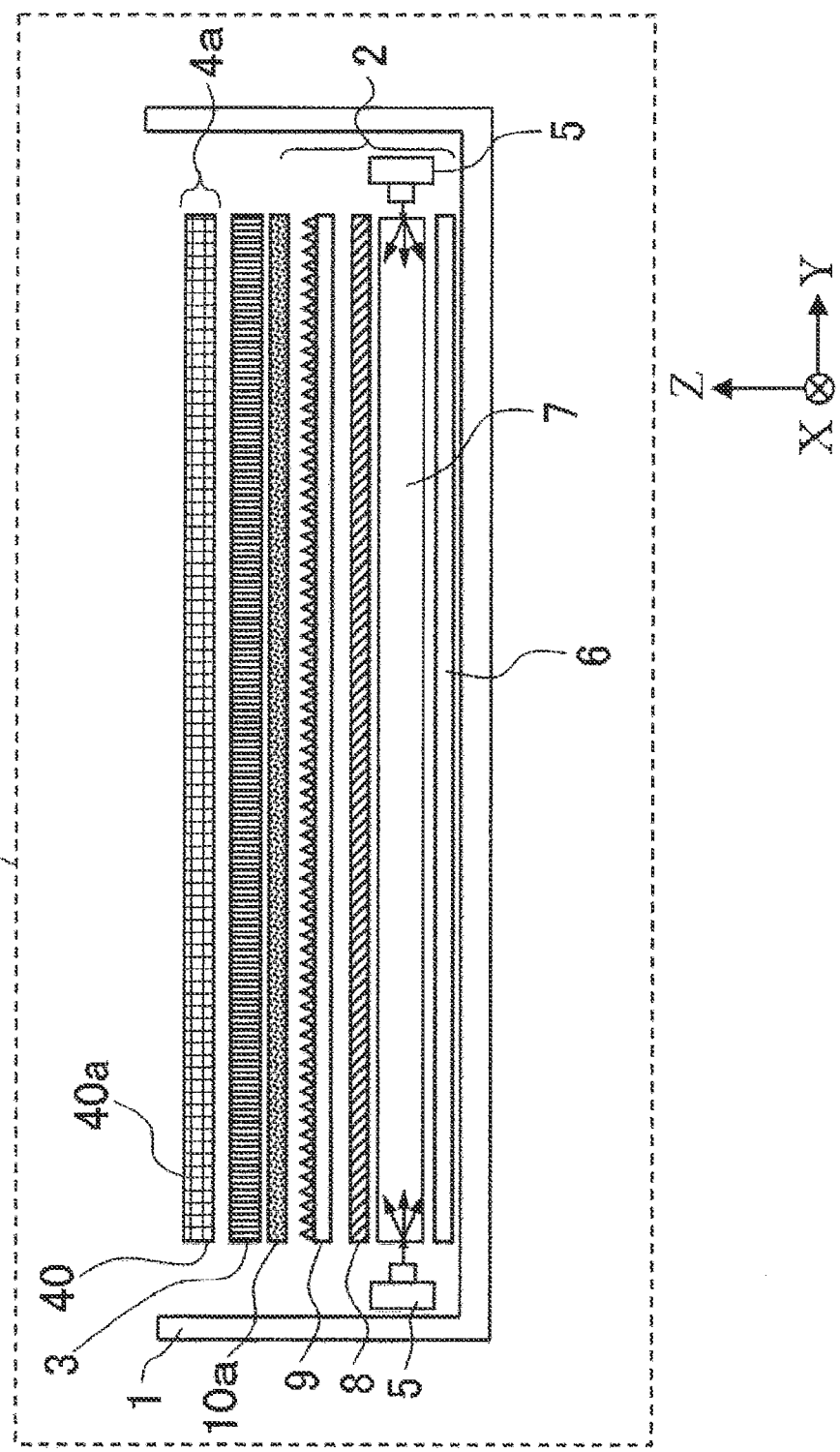
FIG. 8 is a structural drawing illustrating a liquid crystal display device in a third embodiment.

FIG. 8 is a structural drawing schematically illustrating a cross section of a liquid crystal display device 300 in a third embodiment of the invention. The liquid crystal display device 300 includes a housing 1, a backlight unit 2, a liquid crystal cell 3, and a light regulating unit 4a. Components that are the same as in the structural drawing of the liquid crystal display device 100 in the first embodiment above will not be described; the description will focus on the differences. The components that are the same as in the first embodiment are the housing 1, backlight unit 2, and liquid crystal cell 3.

The front surface corresponding to the front surface 17a in the first embodiment is surface 30a in the third embodiment. The 'front surface' is the outermost surface of the liquid crystal display device in the direction in which a picture is displayed. This means the surface of the liquid crystal display device that is farthest in the +Z-axis direction. The 'front side' means the 'front surface side'. The description will make use of the same XYZ coordinates as in the first embodiment.

The backlight unit 2, liquid crystal cell 3, and light regulating unit 4a are included inside the housing 1. The backlight unit 2 is disposed inside the housing 1 and is positioned at the back (the −Z-axis direction side). The liquid crystal cell 3 is positioned further toward the front surface 30a side (the +Z-axis direction side) than the backlight unit 2. The light regulating unit 4a is positioned further toward the front surface 30a side (the +Z-axis direction side) than the liquid crystal cell 3. The backlight unit 2, liquid crystal cell 3, and light regulating unit 4a are thus arranged in this order from the back side (the −Z-axis direction side) toward the front surface 30a side (the +Z-axis direction side).

The structure and function of the backlight unit 2 are the same as in the first embodiment. The structure and function of the liquid crystal cell 3 are also the same as in the first embodiment. Descriptions of these components will therefore be omitted.

The light transmitted through the liquid crystal cell 3 enters the light regulating unit 4a. The light regulating unit 4a includes a cholesteric liquid crystal film 40 as a light regulating film. The cholesteric liquid crystal film 40 includes a cholesteric liquid crystal.

A cholesteric liquid crystal is a liquid crystal in which the molecules are arranged in a layered structure with a regular twist in each layer. A cholesteric liquid crystal is obtained by adding a substance known as a chiral agent to a nematic liquid crystal, which has a parallel non-layered structure, to provide an optical rotation property. An 'optical rotation property' refers to the property of an optically active substance that rotates the polarization plane of linearly polarized light transmitted through it. Here the cholesteric liquid crystal is the optically active substance. A cholesteric liquid crystal is also referred to as a chiral nematic liquid crystal.

Figure 9:
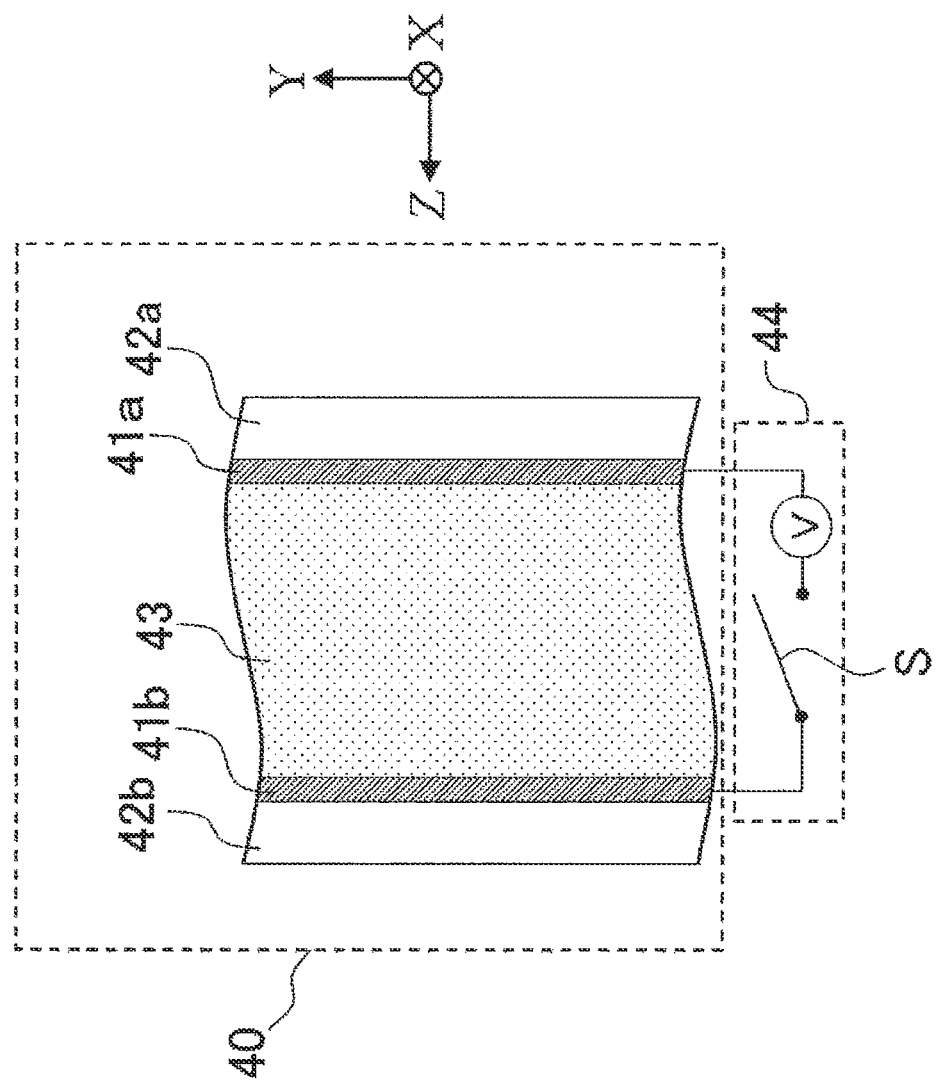
FIG. 9 is a structural drawing illustrating a light regulating film in the third embodiment.

FIG. 9 is a schematic drawing showing an example of the structure of the cholesteric liquid crystal film 40. The cholesteric liquid crystal film 40 includes a protective film 42a, a transparent electrode 41a, a cholesteric liquid crystal 43, a transparent electrode 41b, and a protective film 42b.

The protective film 42a is positioned at the back of the cholesteric liquid crystal film 40 (on its −Z-axis direction side). The transparent electrode 41a is positioned further toward the front surface 40a side (the +Z-axis direction side) than the protective film 42a. The cholesteric liquid crystal 43 is positioned further toward the front surface 40a side (the +Z-axis direction side) than the transparent electrode 41a. The transparent electrode 41b is positioned further toward the front surface 40a side (the +Z-axis direction side) than the cholesteric liquid crystal 43. The protective film 42b is positioned further toward the front surface 40a side (the +Z-axis direction side) than the transparent electrode 41b. The protective film 42a, transparent electrode 41a, cholesteric liquid crystal 43, transparent electrode 41b, and protective film 42b are thus arranged in this order from the back side (the −Z-axis direction side) toward the front surface 40a side (the −Z-axis direction side).

A control unit 44 alters the voltage applied to the transparent electrodes 41a, 41b of the cholesteric liquid crystal film 40. The control unit 44 includes a power source V and a switch S. In FIG. 9, the switch S, which is connected to the power source V, is open. One terminal of the power source V is connected to the transparent electrode film 41a. The other terminal of the power source V is connected to one terminal of the switch S. The other terminal of the switch S is connected to the transparent electrode film 41b. In FIG. 9, the power source V is turned on and off by the switch S. The power source V, however, has the function of continuously varying the voltage.

The transparent electrodes 41a and 41b are made from a material that is transparent like glass. Accordingly, the transparent electrodes 41a and 41b transmit light from the light sources. In some cases the transparent electrodes 41a and 41b are not transparent themselves. These include, for example, cases in which the transparent electrodes are not themselves transparent, but the width of the electrodes is too thin for them to be seen by a person viewing the liquid crystal display device 300.

The purpose of the protective films 42a and 42b is to electrically protect the interior of the cholesteric liquid crystal film 40. Another purpose of the protective films 42a and 42b is to physically protect the interior of the cholesteric liquid crystal film 40. For electrical protection, the protective films 42a and 42b are made of, for example, a transparent dielectric plastic. For physical protection, the functions of the protective films 42a and 42b include protection against external pressure or prevention of the intrusion of moisture.

The operation of the cholesteric liquid crystal film 40 will now be described. The state in which the liquid crystal cell 3 is not illuminated by light from the backlight unit 2 is the state in which the power source of the backlight unit 2 is switched off. In the state in which the power source of the backlight unit 2 is switched off, the control unit 44 applies a voltage that makes the cholesteric liquid crystal film 40 reflect light. That is, in the state in which the backlight unit 2 is off, the cholesteric liquid crystal film 40 is in a light reflecting state. The state in which the cholesteric liquid crystal film 40 reflects light is referred to as the planar state.

Specifically, the control unit 44 applies a voltage such that the liquid crystal molecules point in directions in the X-Y plane. With progress in the Z-axis direction, the directions of the liquid crystal molecules rotate in the X-Y plane, forming a helical structure. The helical axis of the helical structure is perpendicular to the X-Y plane. A cholesteric liquid crystal has a memory property, however. The planar state can therefore be maintained even without continuous application of a voltage to the liquid crystal molecules. That is, the time for which the voltage is applied to the liquid crystal molecules may be short. In order to maintain the light-reflecting planar state, it is not particularly necessary to keep supplying electrical power.

Next, the state in which the liquid crystal cell 3 is illuminated by light from the backlight unit 2 is the state in which the power source of the backlight unit 2 is switched on. In the state in which the power source of the backlight unit 2 is switched on, the control unit 44 momentarily applies a voltage that makes the cholesteric liquid crystal film 40 transmit light. In the state in which the backlight unit 2 is on, the cholesteric liquid crystal film 40 thus assumes a light transmitting state. The light transmitting state of the cholesteric liquid crystal film 40 is referred to as the focal conic state.

Specifically, the control unit 44 momentarily applies a voltage to the liquid crystal molecules such that the liquid crystal molecules orient themselves in the Z-axis direction.

Figure 10:
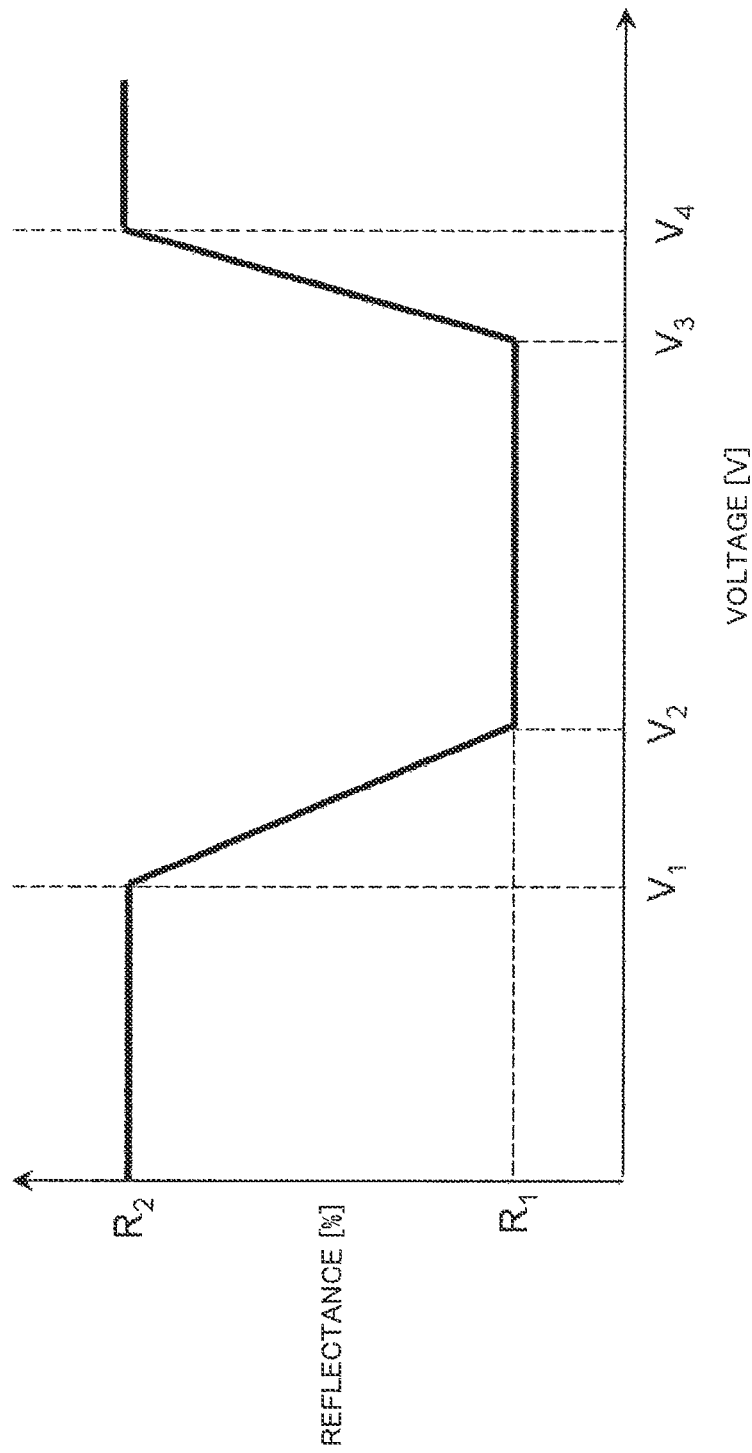
FIG. 10 is a diagram illustrating a method of driving the light regulating film in the third embodiment.

FIG. 10 is a diagram showing the relationship between the voltage applied to the cholesteric liquid crystal film 40 and the reflectance of the liquid crystal. The horizontal axis in FIG. 10 indicates the voltage (V); the vertical axis indicates the reflectance (%). Voltages $V_1$, $V_2$, $V_3$, and $V_4$ are marked on the horizontal axis. Voltage $V_1$ has the smallest voltage value. Voltage $V_4$ has the largest voltage value. The voltage value increases sequentially in the order $V_1$, $V_2$, $V_3$, $V_4$. Reflectances $R_1$ and $R_2$ are marked on the vertical axis. Reflectance $R_2$ has a higher value than reflectance $R_1$. That is, more light is transmitted at reflectance $R_1$ than at reflectance $R_2$. The state with reflectance $R_1$ is the focal conic state. The state with reflectance $R_2$ is the planar state.

A cholesteric liquid crystal has a memory property. For this reason, when no voltage is applied to the liquid crystal molecules, the cholesteric liquid crystal may be in the planar state, the focal conic state, or an intermediate state. The planar state is the light reflecting state. The focal conic state is the light transmitting state.

When the voltage applied to the cholesteric liquid crystal film 40 is 0 or a voltage lower than $V_1$, the state of the liquid crystal does not change. In this state, the reflectance of the cholesteric liquid crystal film 40 is reflectance $R_2$. The cholesteric liquid crystal film 40 is in the planar state.

When the voltage applied to the cholesteric liquid crystal film 40 is between $V_1$ and $V_2$, the liquid crystal, which was in the planar state, changes to a state intermediate between the planar and focal conic states. In this state, the reflectance of the cholesteric liquid crystal film 40 has a value between reflectance $R_2$ and reflectance $R_1$.

When the voltage applied to the cholesteric liquid crystal film 40 is between $V_2$ and $V_3$, the liquid crystal assumes the focal conic state. In this state, the reflectance of the cholesteric liquid crystal film 40 is reflectance $R_1$.

When the voltage applied to the cholesteric liquid crystal film 40 is between $V_3$ and $V_4$, the liquid crystal, which was in the focal conic state, changes to a state intermediate between the focal conic and planar states. In this state, the reflectance of the cholesteric liquid crystal film 40 has a value between reflectance $R_1$ and reflectance $R_2$.

After the voltage applied to the cholesteric liquid crystal film 40 exceeds $V_4$, if the voltage is abruptly reduced to 0, the liquid crystal is in the planar state. In this state, the reflectance of the cholesteric liquid crystal film 40 is reflectance $R_2$.

The color of the reflected light when the cholesteric liquid crystal film 40 is in the planar state depends on the mean refractive index of the liquid crystal layer and the helical pitch of the helical structure. The mean refractive index of the liquid crystal layer depends on the type of liquid crystal material and the type of chiral agent. The helical pitch is adjustable by the chiral agent content ratio. States intermediate between the planar state and the focal conic state are produced by adjusting the voltage. The reflective intensity of the cholesteric liquid crystal film 40 can also be altered by generating such intermediate states. In other words, it becomes possible to alter the saturation of the reflected color.

Application of a voltage that changes the cholesteric liquid crystal film 40 to the transparent focal conic state is preferably delayed by about ten to several tens seconds from the input of a picture signal to the liquid crystal cell 3. A momentary application of the voltage to the cholesteric liquid crystal film 40 then makes the cholesteric liquid crystal film 40 turn transparent. The cholesteric liquid crystal film 40 is made to turn transparent after the backlight unit 2 has been turned on and light that has passed through the liquid crystal cell 3, on which a picture is being displayed, enters the light regulating unit 4.

'The state in which the cholesteric liquid crystal film 40 becomes transparent' indicates the state in which the liquid crystal is in the focal conic state. In other words, in the state in which the cholesteric liquid crystal film 40 is transparent, loss of brightness in the light regulating unit 4 can be held to a minimum. Therefore, when the cholesteric liquid crystal film 40 is transparent, a picture can be displayed on the liquid crystal display device 300 in the normal way.

When input of a picture output signal to the liquid crystal cell 3 ceases, simultaneously with the end of the input of the picture signal, the control unit 44 applies a momentary voltage to the cholesteric liquid crystal film 40 that causes its liquid crystal to transit to the planar state. Alternatively, the control unit 44 applies a momentary voltage to the cholesteric liquid crystal film 40 that causes a transition of its liquid crystal to a state intermediate between the planar state and the focal conic state. Accordingly, when light stops being fed into light regulating unit 4a, the cholesteric liquid crystal film 40 assumes a colored state.

The cholesteric liquid crystal film 40 consequently has a light regulating function similar to that of the light regulating film 17 in the first embodiment. A 'light regulating function' means a function by which light is either transmitted or scattered. The cholesteric liquid crystal film 40 also has the light reflecting function of reflective polarizing film 10b. Thus when a liquid crystal display device with a large screen is placed in a room, use of the cholesteric liquid crystal film 40 can make the liquid crystal display device less obtrusive when not in use. Use of the cholesteric liquid crystal film 40 can also harmonize the liquid crystal display device with interior decor.

By adjustment of the mean refractive index and helical pitch of the liquid crystal layer in the cholesteric liquid crystal film 40, it is possible to give the light reflected in the planar state an arbitrary color. Accordingly, the liquid crystal display device 300 can be set for a color design other than the dark opalescent color described in the first embodiment.

The cholesteric liquid crystal film 40 has a memory property. Therefore, in order to maintain the light-transmitting focal conic state, it is not particularly necessary to keep supplying electrical power. The liquid crystal display device 300 using the cholesteric liquid crystal film 40 is also advantageous in regard to energy conservation.

In the liquid crystal display device 300 in the third embodiment of the invention, the color in the colored state can be changed by changing the composition of the cholesteric liquid crystal 43. The transparent electrode 41a, cholesteric liquid crystal 43, and transparent electrode 41b are configured in layers between the protective film 42a and protective film 42b. This enables the mixing of arbitrary colors in the liquid crystal display device 300. By synthesizing arbitrary colors, the liquid crystal display device 300 can increase the degree of freedom in interior design.

Since the control unit 44 operates as described above, the light regulating unit 4a becomes transparent after the liquid crystal cell 3 is already displaying a picture. Because of this, although the picture can be seen through the light regulating unit 4a, the internal structure of liquid crystal display device 300 is never seen from the outside (+Z direction). When the display of the picture by the liquid crystal cell 3 stops, the light regulating unit 4 simultaneously becomes colored. As a result, the liquid crystal display device 300 appears in harmony with interior decor. If the backlight unit 2 feeds in light before a picture is displayed on the liquid crystal cell 3, the internal structure of the liquid crystal display device 300 might become visible from the outside (+Z direction). Since the light regulating unit 4 is colored, the problem of the internal structure of the liquid crystal display device 300 being visible from the outside (+Z direction) does not occur. The liquid crystal display device 300 can harmonize with interior decor without being excessively obtrusive when not in use.

FIG. 11 is a structural drawing of a liquid crystal display device 300a. The liquid crystal display device 300a shown in FIG. 11 differs from the liquid crystal display device 300 shown in FIG. 8 in that it includes a reflective polarizing film 10b. In the structure of the liquid crystal display device 300, the light regulating unit 4a uses only the cholesteric liquid crystal film 40 as a light blocking means. However, some materials of which the cholesteric liquid crystal 43 may be made lack sufficiently high reflectance; even in the planar state their transparency is so high that the back side (the −Z-axis direction side) is visible through them. Insufficiently high reflectance means an insufficient degree of coloration. That is, the light reflecting function of the cholesteric liquid crystal film 40 is too low in these cases.

As a remedy in these cases, the liquid crystal display device 300a shown in FIG. 11 places the reflective polarizing film 10b described in the first embodiment between the liquid crystal cell 3 and cholesteric liquid crystal film 40. In other words, the reflective polarizing film 10b is positioned further toward the +Z side than the liquid crystal cell 3. The reflective polarizing film 10b is positioned further toward the −Z side than the cholesteric liquid crystal film 40. This structure enables the liquid crystal display device 300a to harmonize with interior decor when not in use, without being excessively obtrusive.

As in the first embodiment, a structure in which the reflective polarizing film 10b, instead of the polarizing plate 11b, is disposed on the front surface 40a side (the +Z-axis direction) of the glass plate 12b in the liquid crystal cell 3 can also produce the same effects.

The light regulating members 40 in the liquid crystal display devices 300 and 300a employ a cholesteric material.

Fourth Embodiment

FIG. 12 is a structural drawing schematically illustrating a cross section of a liquid crystal display device 400 in a fourth embodiment of the invention. The liquid crystal display device 400 includes a housing 1, a backlight unit 2, a liquid crystal cell 3, and a light regulating unit 4b. Components that are the same as in the structural drawing of the liquid crystal display device 100 in the first embodiment above will not be described; the description will focus on the differences. The components that are the same as in the first embodiment are the housing 1, backlight unit 2, and liquid crystal cell 3. The surface corresponding to the front surface 17a in the first embodiment is a surface 17a in the fourth embodiment. The 'front surface' is the outermost surface of the liquid crystal display device in the direction in which a picture is displayed. This is the surface of the liquid crystal display device that is farthest in the +Z-axis direction. The 'front side' means the 'front surface side'. The description will make use of the same XYZ coordinates as in the first embodiment.

The backlight unit 2, liquid crystal cell 3, and light regulating unit 4b are included inside the housing 1. The backlight unit 2 is disposed and positioned at the back (the −Z-axis direction side) inside the housing 1. The liquid crystal cell 3 is positioned further toward the front surface 17a side (the +Z-axis direction side) than the backlight unit 2. The light regulating unit 4b is positioned further toward the front surface 17a side (the +Z-axis direction side) than the liquid crystal cell 3. The backlight unit 2, liquid crystal cell 3, and light regulating unit 4b are thus arranged in this order from the back side (the −Z-axis direction side) toward the front surface 17a side (the +Z-axis direction side).

The structure and function of the backlight unit 2 are the same as in the first embodiment. The structure and function of the liquid crystal cell 3 are also the same as in the first embodiment. Descriptions of these components will therefore be omitted.

Light transmitted through the liquid crystal cell 3 enters the light regulating unit 4b. The light regulating unit 4b includes a reflective polarizing film 10b, a liquid crystal shutter 24, and a light regulating film 17. The reflective polarizing film 10b is disposed behind the liquid crystal shutter 24 (in the −Z-axis direction). The liquid crystal shutter 24 is disposed behind the light regulating film 17 (in the −Z-axis direction). That is, the liquid crystal shutter 24 is disposed between the reflective polarizing film 10b and the light regulating film 17.

FIG. 13 is a structural drawing of the liquid crystal shutter 24. The liquid crystal shutter 24 includes a polarizing plate 11, glass plates 12a, 12b, transparent electrodes 13a, 13b, alignment films 16a, 16b, and a liquid crystal layer 140. A liquid crystal shutter control unit 45 is connected to the liquid crystal shutter 24.

The glass plate 12a is positioned closest to the back (in the −Z-axis direction) in the liquid crystal shutter 24. The transparent electrode 13a is positioned further toward the front surface 17a side (in the +Z-axis direction) than the glass plate 12a. The alignment film 16a is positioned further toward the front surface 17a side (in the +Z-axis direction) than the transparent electrode 13a. The liquid crystal layer 140 is positioned further toward the front surface 17a side (in the +Z-axis direction) than the alignment film 16a. The alignment film 16b is positioned further toward the front surface 17a side (in the +Z-axis direction) than the liquid crystal layer 140. The transparent electrode 13b is positioned further toward the front surface 17a side (in the +Z-axis direction) than the alignment film 16b. The glass plate 12b is positioned further toward the front surface 17a side (in the +Z-axis direction) than the transparent electrode 13b. The polarizing plate 11 is positioned further toward the front surface 17a side (in the +Z-axis direction) than the glass plate 12b. The polarizing plate 11 is positioned closest to the front surface 17a side (the +Z-axis direction) in the liquid crystal shutter 24. The glass plate 12a, transparent electrode 13a, alignment film 16a, liquid crystal layer 140, alignment film 16b, transparent electrode 13b, glass plate 12b, and polarizing plate 11 are thus arranged in this order from the −Z direction to the +Z direction.

The alignment films 16 are grooved films. Both the alignment films 16a and 16b will be described as the alignment films 16. When the liquid crystal molecules make contact with the alignment films 16, the liquid crystal molecules realign themselves with the grooves. The liquid crystal layer 140 is interposed between the alignment film 16a and alignment film 16b. The alignment of the grooves in the alignment film 16a differs from the alignment of the grooves in the alignment film 16b by 90 degrees in the X-Y plane. That causes the liquid crystal molecules of the liquid crystal layer 140 to line up with a 90-degree twist in the X-Y plane.

The glass plates 12a and 12b may be made of a transparent plastic material. The transparent electrodes 13a and 13b apply a voltage across the liquid crystal layer 140. The transparent electrodes 13a and 13b are made from a material that is transparent like glass. The transparent electrodes 13a and 13b therefore transmit light from the light sources 5. This also includes cases in which the transparent electrodes 13a and 13b are not themselves transparent but, for example, the width of the wire electrodes is too thin for them to be seen by a person viewing the liquid crystal display device 400.

The polarization direction of polarizing plate 11 is the same as the polarization direction of reflective polarizing film 10b. Specifically, if the reflective polarizing film 10b is polarized in the X-axis direction (vertical polarization), the polarizing plate 11 is also polarized in the X-axis direction (vertical polarization). In the description given here, as an example, the reflective polarizing film 10b and polarizing plate 11 are both vertically polarized.

Light exiting the liquid crystal cell 3 passes through the reflective polarizing film 10b and enters the liquid crystal shutter 24. The light that enters the liquid crystal shutter 24 propagates in alignment with its liquid crystal layer 140.

First, the case in which the liquid crystal layer 140 is a liquid crystal of the TN (Twisted Nematic mode) type will be described. The liquid crystal molecules of a TN liquid crystal are arranged in such a way that the alignment of the liquid crystal molecules is twisted by 90 degrees when no voltage is applied.

The transparent electrodes 13a and 13b are connected to the liquid crystal shutter control unit 45. FIG. 13 shows the case in which no voltage is applied across the transparent electrode 13a and transparent electrode 13b. The liquid crystal shutter control unit 45 includes a power source V and a switch S. In FIG. 13, the switch S, which is connected to the power source V, is open. One terminal of the power source V is connected to the transparent electrode 13a. The other terminal of the power source V is connected to one terminal of the switch S. The other terminal of the switch S is connected to the transparent electrode 13b. The liquid crystal shutter control unit 45 can change the voltage application state of the transparent electrodes 13a, 13b. That is, in FIG. 13 the power source V is turned on and off by the switch S. The power source V, however, has the function of continuously varying the voltage.

When no voltage is applied to the transparent electrodes 13a, 13b, the alignment of the liquid crystal molecules of the liquid crystal layer 140 is twisted by 90 degrees in the X-Y plane. Specifically, the alignment of the liquid crystal molecules is the X-axis direction on the −Z-axis direction side of the liquid crystal shutter 24 and the Y-axis direction on the +Z-axis direction side of the liquid crystal shutter 24. Proceeding from the −Z-axis direction to the +Z-axis direction, the alignment of the liquid crystal molecules thus rotates by 90 degrees from the vertical direction (the X-axis direction) to the horizontal direction (the Y-axis direction). That is, while light incident on the liquid crystal shutter 24 from the reflective polarizing film 10b is vertically polarized, the alignment of the liquid crystal on the −Z side of the liquid crystal layer 140 is the X-axis direction (the vertical direction). Therefore, the light cannot enter the liquid crystal layer 140.

When a voltage is applied to the transparent electrodes 13a, 13b, however, the twist between the liquid crystal molecules of the liquid crystal layer 140 and the light is released. That is, the liquid crystal molecules of the liquid crystal layer 140 are not rotated by 90 degrees in the X-Y plane. The liquid crystal molecules of the liquid crystal layer 140 are oriented in the Z-axis direction. For this reason, the light incident from the reflective polarizing film 10b becomes capable of entering the liquid crystal layer 140. The polarization direction of the light that propagates in alignment with the liquid crystal layer 140 does not rotate by 90 degrees as it propagates through the liquid crystal layer 140.

The polarizing plate 11 has the same polarization direction (vertical polarization) as the reflective polarizing film 10b. When light passes through the reflective polarizing film 10b, its polarization directions become aligned (in vertical polarization). Since the polarization direction of the light is not rotated when it propagates through the liquid crystal layer 140, it can pass through the polarizing plate 11. That is, since the polarization direction of the light that has propagated through the liquid crystal layer 140 is vertical, it can pass through the polarizing plate 11 (vertical polarization).

A VA liquid crystal, a TN liquid crystal, an IPS liquid crystal, an OCB liquid crystal, or the like may be used in the liquid crystal layer 140 shown in FIG. 13. The type of liquid crystal used determines the relationship between the polarization direction of polarizing plate 11 and the polarization direction of reflective polarizing film 10b. Only when a voltage is applied to the transparent electrodes 13a, 13b can light propagating from the reflective polarizing film 10b into the liquid crystal layer 140 pass through the polarizing plate 11.

Specifically, if the polarization direction of light rotates in the X-Y plane inside the liquid crystal layer 140 when a voltage is applied to the transparent electrodes 13a, 13b, the polarizing plate 11 is disposed in such a way that its polarization direction is rotated in the X-Y plane with respect to that of reflective polarizing film 10b. If the polarization direction of light does not rotate inside the liquid crystal layer 140 when a voltage is applied to the transparent electrodes 13a, 13b, the polarizing plate 11 is disposed in such a way that its polarization direction is aligned with that of reflective polarizing film 10b.

Only when a voltage is applied to the transparent electrodes 13a, 13b can light exiting the liquid crystal cell 3 pass through the reflective polarizing film 10b and then pass through the liquid crystal shutter 24 without changing its polarization direction. The light that has passed through the liquid crystal shutter 24 enters the light regulating film 17. The light regulating film 17 is of one of several types, including those shown in the first to third embodiments: the encapsulated liquid crystal type, the electrochromic type, and the cholesteric liquid crystal type. The description given here will use the encapsulated liquid crystal type as an example.

Applying a voltage to the transparent electrodes 13a, 13b enables light exiting the liquid crystal cell 3 and passing through the reflective polarizing film 10b to pass through the liquid crystal shutter 24 and enter the light regulating film 17. As described in relation to FIGS. 3 and 4 in the first embodiment, the light regulating film 17 transmits light only when a voltage is applied across its transparent electrodes 20a and 20b. Therefore, the light regulating film 17 can transmit light when voltages are applied to both transparent electrodes 13a, 13b and transparent electrodes 20a, 20b. Then light exiting the liquid crystal cell 3 can escape from the liquid crystal display device 400 to the outside.

The application of voltage to the transparent electrodes 13a, 13b is performed separately from the application of voltage to the transparent electrodes 20a and 20b. Voltage is applied to the liquid crystal shutter 24 and light regulating film 17 when a picture is displayed on the liquid crystal cell 3. If the liquid crystal shutter 24 and light regulating film 17 then become transparent, the liquid crystal display device 400 can display the picture in the normal way.

Light illuminating the liquid crystal display device 400 from the outside (external light 22) will now be considered. When the light regulating film 17 is in a transparent state, part of the external light 22 is reflected at the interface between the light regulating film 17 and the air. Most of the external light 22, however, enters the light regulating film 17 and is transmitted through the light regulating film 17.

Without the liquid crystal shutter 24, the external light 22 transmitted through the light regulating film 17 would reach the reflective polarizing film 10b unaltered, as described in the first embodiment. Since the external light 22 is unpolarized light, because of the properties of reflective polarizing film 10b, fifty percent of the external light 22 reaching the reflective polarizing film 10b would be reflected. The reflection of external light 22 might reduce picture contrast.

In the liquid crystal display device 400 in the fourth embodiment, however, the liquid crystal shutter 24 is disposed between the light regulating film 17 and reflective polarizing film 10b. The external light 22 transmitted through the light regulating film 17 therefore encounters the polarizing plate 11 of the liquid crystal shutter 24. Of this incident external light 22, the polarizing plate 11 transmits only light polarized in a prescribed direction (vertically polarized light). The polarizing plate 11 absorbs light that is not polarized in the prescribed direction (horizontally polarized light). That is, the polarizing plate 11 absorbs fifty percent of the incident external light 22. The polarizing plate 11 transmits the remaining fifty percent of the light (vertically polarized light). The light that passes through the polarizing plate 11 (vertically polarized light) also passes through the glass plate 12b and reaches the liquid crystal layer 140.

When the liquid crystal layer 140 is of the TN type and a voltage is applied across the transparent electrodes 13a and 13b, the twisting relationship between the polarization direction of the liquid crystal molecules of the liquid crystal layer 140 and the polarization direction of the light disappears. That is, the liquid crystal molecules cease to be rotated by 90 degrees in the X-Y plane. Accordingly, the polarization direction (vertical polarization) of the light propagating in alignment with the liquid crystal layer 140 is not rotated by 90 degrees in the X-Y plane during passage through the liquid crystal layer 140. The light therefore passes unhindered through the reflective polarizing film 10b (which has vertical polarization). The polarization direction of reflective polarizing film 10b is the same as the polarization direction of polarizing plate 11 (vertical polarization). That is, the external light 22 is not reflected by the reflective polarizing film 10b. The liquid crystal display device 400 can therefore suppress loss of contrast when a picture is displayed.

When no voltage is applied across the transparent electrodes 20a and 20b of the light regulating film 17, however, the liquid crystal molecules in the encapsulated liquid crystals 18 align at random. That is, the liquid crystal molecules in the encapsulated liquid crystals 18 have no fixed direction of alignment. Therefore, due to a difference in refractive indexes between the polymer film 19 and the liquid crystal molecules in the encapsulated liquid crystals 18, most of the external light 22 cannot travel straight and scatters. Most of the external light 22 also cannot travel straight and scatters because of the birefringence of the liquid crystal molecules in the encapsulated liquid crystal 18. 'Birefringence' is the property of having a refractive index that varies depending on the direction of incident light. Part of the external light 22 passes through the light regulating film 17. More specifically, a few percent of the external light 22 passes through the light regulating film 17. The interior of the housing 1 is therefore faintly visible. The quantity of light reflected by the light regulating film 17 is relatively large, however, so the light regulating film 17 appears whitish overall.

Of the incoming external light 22, the light that passes through the light regulating film 17 propagates in the −Z-axis direction and strikes the polarizing plate 11 in the liquid crystal shutter 24. Of the incident external light 22, the polarizing plate 11 transmits only light polarized in a prescribed direction (vertically polarized light). The polarizing plate 11 absorbs light that is not polarized in the prescribed direction (horizontally polarized light). The external light 22, which is unpolarized, remains unpolarized even after passing through the light regulating film 17. As a result, fifty percent of the external light 22 (horizontally polarized light) that strikes the polarizing plate 11 is absorbed. The remaining fifty percent of the external light 22 (vertically polarized light) passes through the polarizing plate 11 and reaches the glass plate 12b. The external light 22 transmitted through the glass plate 12b then reaches the liquid crystal layer 140.

When no voltage is applied across the transparent electrodes 20a and 20b of the light regulating film 17, no picture is being displayed on the liquid crystal display device 400. In this case, no voltage is applied to the transparent electrodes 13a, 13b in the liquid crystal shutter 24 either. The liquid crystal molecules of the liquid crystal layer 140 are aligned in the same direction as the polarization direction of polarizing plate 11. That is, with progress in the −Z-axis direction, the alignment of the liquid crystal molecules rotates by 90 degrees in the X-Y plane from the horizontal direction (the Y-axis direction) to the vertical direction (the X-axis direction).

The external light 22 propagates in the −Z-axis direction in alignment with the liquid crystal layer 140. The polarization direction of the external light 22 rotates by 90 degrees as it propagates through the liquid crystal layer 140. Therefore, the external light 22 that propagates in alignment with the liquid crystal layer 140 cannot pass through the reflective polarizing film 10b and is entirely reflected.

The external light 22 reflected by the reflective polarizing film 10b propagates back through the liquid crystal layer 140 in the +Z-axis direction. The polarization direction of the external light 22 is again rotated by 90 degrees in the X-Y plane. Accordingly, the reflected light (the external light 22) propagating in alignment with the liquid crystal layer 140 can pass through the polarizing plate 11. The external light 22 then enters the light regulating film 17. As a result, the light regulating film 17 appears brightly opalescent.

To sum up, when the liquid crystal cell 3 is displaying a picture, a voltage is applied to the light regulating film 17 to make the light regulating film 17 transparent. At the same time, a voltage is also applied to the liquid crystal shutter 24 to make the liquid crystal shutter 24 transparent. This enables liquid crystal display device 400 to display the picture with reduced loss of contrast.

When the liquid crystal cell 3 is not displaying a picture, no voltage is applied to the light regulating film 17. No voltage is applied to the liquid crystal shutter 24 either. 'When the liquid crystal cell 3 is not displaying a picture' is when the liquid crystal display device 400 is not being used. This can make the front surface 17a opalescent. 'Opalescent' is a slightly yellowish milky white color.

The liquid crystal display device 400 has a liquid crystal cell member 3, a light regulating member 17, a reflective polarizing member 10b, and a control unit 23. The liquid crystal display device 400 also has a liquid crystal shutter 24 and a liquid crystal shutter control unit 45. The liquid crystal shutter 24 is disposed between the reflective polarizing member 10b and the light regulating member 17. The liquid crystal shutter control unit 45 alters the voltage state of a third voltage that is applied to the liquid crystal shutter. The liquid crystal shutter 24 has a polarizing layer 11 and a second liquid crystal layer 140. The polarizing layer 11 transmits specific polarized light and absorbs other polarized light. In the second liquid crystal layer 140, the alignment of the liquid crystal molecules is altered by application of the third voltage. When the backlight unit is on, the liquid crystal shutter 24 transmits light and the reflective polarizing member 10b transmits light. When the backlight unit 2 is off, the liquid crystal shutter 24 blocks light and the reflective polarizing member 10b reflects light. In the fourth embodiment, the polarizing layer is described as the polarizing plate 11. It is not always necessary, however, for the polarizing plate 11 to be a plate. The polarizing plate 11 may be, for example, a film or the like.

In the foregoing embodiments it is contemplated that, for example, completely dark pictures may be included among the displayed pictures. Those completely dark pictures are considered to be displayed, so 'the display of a picture' includes the display of a completely dark picture.

It is contemplated that the backlight may be in the off state in connection with the display of a picture, due to local dimming control or the like, for example. The expression 'the backlight is on' includes this off state. That is, the backlight is also said to be 'on' when it is in the off state in connection with the display of a picture. 'Local dimming' is a function that automatically controls the local brightness of the backlight according to the picture, to improve the contrast ratio of the picture while reducing power consumption.

Terms such as 'parallel', 'perpendicular', 'orthogonal', and 'parallel' have been used in the foregoing embodiments to indicate shapes of components or positional relationships between components. The ranges of meaning that these terms express include allowances for manufacturing tolerances, assembly variability, and the like. When the following claims recite the shapes of components or positional relationships between components, accordingly, the indicated ranges include allowances for manufacturing tolerances, assembly variability, and the like.

Although embodiments of the invention have been described above, the invention is not limited to these embodiments.

REFERENCE CHARACTERS 1 housing, 2 backlight unit, 3 liquid crystal cell, 4, 4a light regulating unit, 5 light source, 6 reflective sheet, 7 light guide plate, 8 diffusion film, 9 brightness enhancement film, 10 reflective polarizing film, 11 polarizing plate, 12 glass plate, 13 transparent electrode, 14, 140 liquid crystal layer, 15 color filter, 16 alignment film, 17 light regulating film, 17a, 30a, 40a front surface, 18 encapsulated liquid crystal, 19 polymer film, 20, 31, 41 transparent electrode, 21, 32, 42 protective film, 22 external light, 23, 35, 44 control unit, 24 liquid crystal shutter, 30 electrochromic film, 33 electrolyte, 34 electrochromic material, 40 cholesteric liquid crystal film, 45 liquid crystal shutter control unit, 100, 200, 200a, 300, 400 liquid crystal display device, S switch, V power supply, V1, V2, V3, V4 voltage, R1, R2 reflectance.

What is claimed is:

1. A liquid crystal display device comprising:
   a liquid crystal cell member having a first liquid crystal layer in which an alignment of liquid crystal molecules is altered by application of a first voltage;
   a light regulating member disposed on a display surface side of the liquid crystal cell member, the light regulating member having an optical transmittance that is altered by an application state of a second voltage and being configured to scatter light;
   a reflective polarizing member disposed between the light regulating member and the first liquid crystal layer, the reflective polarizing member transmitting specific polarized light and reflecting other polarized light; and
   a control unit for altering the application state of the second voltage; wherein
   light incident on the reflective polarizing member from the first liquid crystal layer has a polarization direction identical to a polarization direction of light transmitted by the reflective polarizing member; and
   the control unit alters the application state of the second voltage in such a manner that the transmittance of the light regulating member when a backlight unit is on is higher than the transmittance of the light regulating member when the backlight unit is off.

2. The liquid crystal display device of claim 1, further comprising
   a polarizing member for transmitting specific polarized light and absorbing other polarized light between the first liquid crystal layer and the reflective polarizing member, wherein:
   the polarization direction of the reflective polarizing member is identical to the polarization direction of the polarizing member.

3. The liquid crystal display device of claim 1, wherein the light regulating member has an encapsulated liquid crystal structure in which a polymer film including encapsulated liquid crystals is disposed between a plurality of transparent electrodes.

4. The liquid crystal display device of claim 1, wherein the light regulating member employs an electrochromic material.

5. The liquid crystal display device of claim 1, wherein the light regulating member employs a cholesteric liquid crystal.

6. The liquid crystal display device of claim 1, further comprising:
   a liquid crystal shutter disposed between the reflective polarizing member and the light regulating member; and
   a liquid crystal shutter control unit for altering a voltage state of a third voltage applied to the liquid crystal shutter; wherein
   the liquid crystal shutter has a polarizing layer and a second liquid crystal layer;
   the polarizing layer transmits specific polarized light and absorbs other polarized light;
   in the second liquid crystal layer, alignment of liquid crystal molecules is altered by application of the third voltage;
   when the backlight unit is on, the liquid crystal shutter transmits light and the reflective polarizing member transmits light; and
   when the backlight unit is off, the liquid crystal shutter blocks light and the reflective polarizing member reflects light.

7. The liquid crystal display device of claim 1, wherein the control unit raises the transmittance of the light regulating member after a picture is displayed on the liquid crystal cell member, and alters the application state of the second voltage in such a manner that the transmittance of the light regulating member is lowered simultaneously with stopping of the displaying of the picture on the liquid crystal cell member.

* * * * *